(12) United States Patent
Dixit et al.

(10) Patent No.: US 11,720,600 B1
(45) Date of Patent: Aug. 8, 2023

(54) METHODS AND APPARATUS FOR MACHINE LEARNING TO PRODUCE IMPROVED DATA STRUCTURES AND CLASSIFICATION WITHIN A DATABASE

(71) Applicant: Enterprise e-Support Inc., Springfield, VA (US)

(72) Inventors: Chintan Dixit, Lorton, VA (US); Avyuk Dixit, Lorton, VA (US); Abhigya Maskay, Alexandria, VA (US)

(73) Assignee: ENTERPRISE E-SUPPORT INC., Springfield, VA (US)

( * ) Notice: Subject to any disclaimer, the term of this patent is extended or adjusted under 35 U.S.C. 154(b) by 2 days.

(21) Appl. No.: 16/716,195

(22) Filed: Dec. 16, 2019

Related U.S. Application Data

(60) Provisional application No. 62/780,411, filed on Dec. 17, 2018.

(51) Int. Cl.
| | |
|---|---|
| *G06F 16/00* | (2019.01) |
| *G06F 16/28* | (2019.01) |
| *G06N 20/00* | (2019.01) |
| *G06F 16/245* | (2019.01) |
| *G06F 16/22* | (2019.01) |

(52) U.S. Cl.
CPC ......... *G06F 16/285* (2019.01); *G06F 16/2246* (2019.01); *G06F 16/245* (2019.01); *G06N 20/00* (2019.01)

(58) Field of Classification Search
CPC .... G06F 16/285; G06F 16/2246; G06N 20/00; G06F 16/245
USPC .......................................... 707/738, 600-899
See application file for complete search history.

(56) References Cited

U.S. PATENT DOCUMENTS

| | | | |
|---|---|---|---|
| 8,769,480 B1* | 7/2014 | Wagner et al. | .... G06Q 30/0201 717/101 |
| 9,286,290 B2 | 3/2016 | Allen et al. | |
| 9,672,497 B1 | 6/2017 | Lewis et al. | |
| 2008/0010262 A1* | 1/2008 | Frank | .................... G06F 16/38 |
| 2009/0119095 A1 | 5/2009 | Beggelman et al. | |
| 2015/0286945 A1* | 10/2015 | Brewster et al. | ........ G06N 5/04 706/46 |
| 2016/0328470 A1 | 11/2016 | Indeck et al. | |
| 2017/0103167 A1 | 4/2017 | Shah | |
| 2018/0336896 A1* | 11/2018 | McGann et al. | ......... G06N 7/01 |
| 2019/0356609 A1* | 11/2019 | Grunwald et al. | ... G06F 16/275 |
| 2020/0007312 A1* | 1/2020 | Vouk et al. | .......... H04L 9/3239 |

* cited by examiner

*Primary Examiner* — Irete F Ehichioya
*Assistant Examiner* — Shirley D Hicks
(74) *Attorney, Agent, or Firm* — COOLEY LLP

(57) ABSTRACT

In some embodiments, a method includes extracting metadata of a set of assets and providing the metadata to a machine learning model to define a tree data structure including a leader subtree and a follower subtree that is dependent upon a portion of a hierarchical classification structure of the leader subtree. The method further includes matching the metadata to attributes assigned to classification nodes within the tree data structure to map the set of assets into data nodes of the tree data structure. The method further includes parsing a query to traverse the tree data structure to locate an asset based at least in part on the query attribute and at least one of the attributes assigned to the classification nodes, and, after and/or in response to parsing the query, sending a signal representing the asset and/or a location of the asset.

20 Claims, 12 Drawing Sheets

300

```
┌─────────────────────────────────────────────────────────┐
│ Extract metadata associated with a set of assets from a set of │
│                    electronic sources                    │
│                          302                             │
└─────────────────────────────────────────────────────────┘
                            │
┌─────────────────────────────────────────────────────────┐
│ Provide the metadata to a machine learning model to define a tree │
│ data structure including a leader subtree and a follower subtree that │
│      is linked to and dependent upon a portion of a hierarchical │
│         classification structure of the leader subtree, the hierarchical │
│       classification structure includes internal classification nodes and │
│       external classification nodes, the portion of the hierarchical │
│    classification structure includes the internal classification nodes of │
│  the leader subtree and excludes the external classification nodes of │
│    the leader subtree, both the leader subtree and the follower subtree │
│                are linked to a common root node         │
│                          304                             │
└─────────────────────────────────────────────────────────┘
                            │
┌─────────────────────────────────────────────────────────┐
│ Match the metadata to attributes assigned to classification nodes │
│   within the tree data structure to map the set of assets into data │
│                nodes of the tree data structure          │
│                          306                             │
└─────────────────────────────────────────────────────────┘
                            │
┌─────────────────────────────────────────────────────────┐
│ Receive a query for an asset from the set of assets, the query │
│                 includes a query attribute               │
│                          308                             │
└─────────────────────────────────────────────────────────┘
                            │
┌─────────────────────────────────────────────────────────┐
│ Parse the query to traverse the tree data structure to locate the │
│ asset based at least in part on the query attribute and at least one of │
│        the attributes assigned to the classification nodes │
│                          310                             │
└─────────────────────────────────────────────────────────┘
                            │
┌─────────────────────────────────────────────────────────┐
│     Add an indication of the query to a distributed ledger │
│                          312                             │
└─────────────────────────────────────────────────────────┘
```

FIG. 5

Route before hitting a cycle: (A,B,D,G,D,H,D,I,B)

METHODS AND APPARATUS FOR MACHINE LEARNING TO PRODUCE IMPROVED DATA STRUCTURES AND CLASSIFICATION WITHIN A DATABASE

CROSS REFERENCE TO RELATED APPLICATION

This application claims priority to and the benefit of U.S. Provisional Application No. 62/780,411, filed Dec. 17, 2018 and titled "Methods and Apparatus for Improved Data Structures and Classification," which is incorporated herein by reference in its entirety.

BACKGROUND

Embodiments described herein relate generally to improved data structures, and more particularly to methods and apparatus for improved tree data structure formation and access to data via the improved tree data structure.

Data storage and access to the data within, for example, an enterprise or organization, is often labor intensive, and inefficient (e.g., with respect to data storage, computing power, cost, data access, data sharing, and the like) due in part to inconsistencies in how the data is organized, stored, classified, shared, and accessed across the enterprise or organization. As an example, an organization may store a document, for example a vendor contract, within multiple locations within the organization, and the document may be classified and/or stored in multiple data structures that are different across multiple locations. The vendor contract, for example, may be stored in a first data structure formed for and/or by a legal department within the organization as well as in a second data structure formed for and/or by a finance department within the organization. The first and second data structures may have inconsistent classifications, e.g., the legal department may classify the vendor contract as a legal agreement whereas the financial department may classify the vendor contract as a midsize business expense document. Such inconsistency may limit the speed at which the vendor contract can be obtained in response to a query, and may require inefficient catalogs, or other inefficient solutions, to store, share, and locate the vendor contract. This example inconsistency compounded across an organization or enterprise with multiple departments and data classification structures can require a large amount of computing power and expense, supplemented by manual, labor intensive and expensive data governance.

Accordingly, a need exists for improved data structure formation and access to data stored within or in accordance with the data structure.

SUMMARY

In some embodiments, a method includes extracting metadata of a set of assets and providing the metadata to a machine learning model to define a tree data structure including a leader subtree and a follower subtree that is dependent upon a portion of a hierarchical classification structure of the leader subtree. The method further includes matching the metadata to attributes assigned to classification nodes within the tree data structure to map the set of assets into data nodes of the tree data structure. The method further includes parsing a query to traverse the tree data structure to locate an asset based at least in part on the query attribute and at least one of the attributes assigned to the classification nodes, and, after and/or in response to parsing the query, sending a signal representing the asset and/or a location of the asset.

BRIEF DESCRIPTION OF THE DRAWINGS

FIG. 5 is a flow chart illustrating a method of defining a tree data structure, and using the tree data structure to organize, locate, and/or share assets, according to another embodiment.

DETAILED DESCRIPTION

Figure 1:
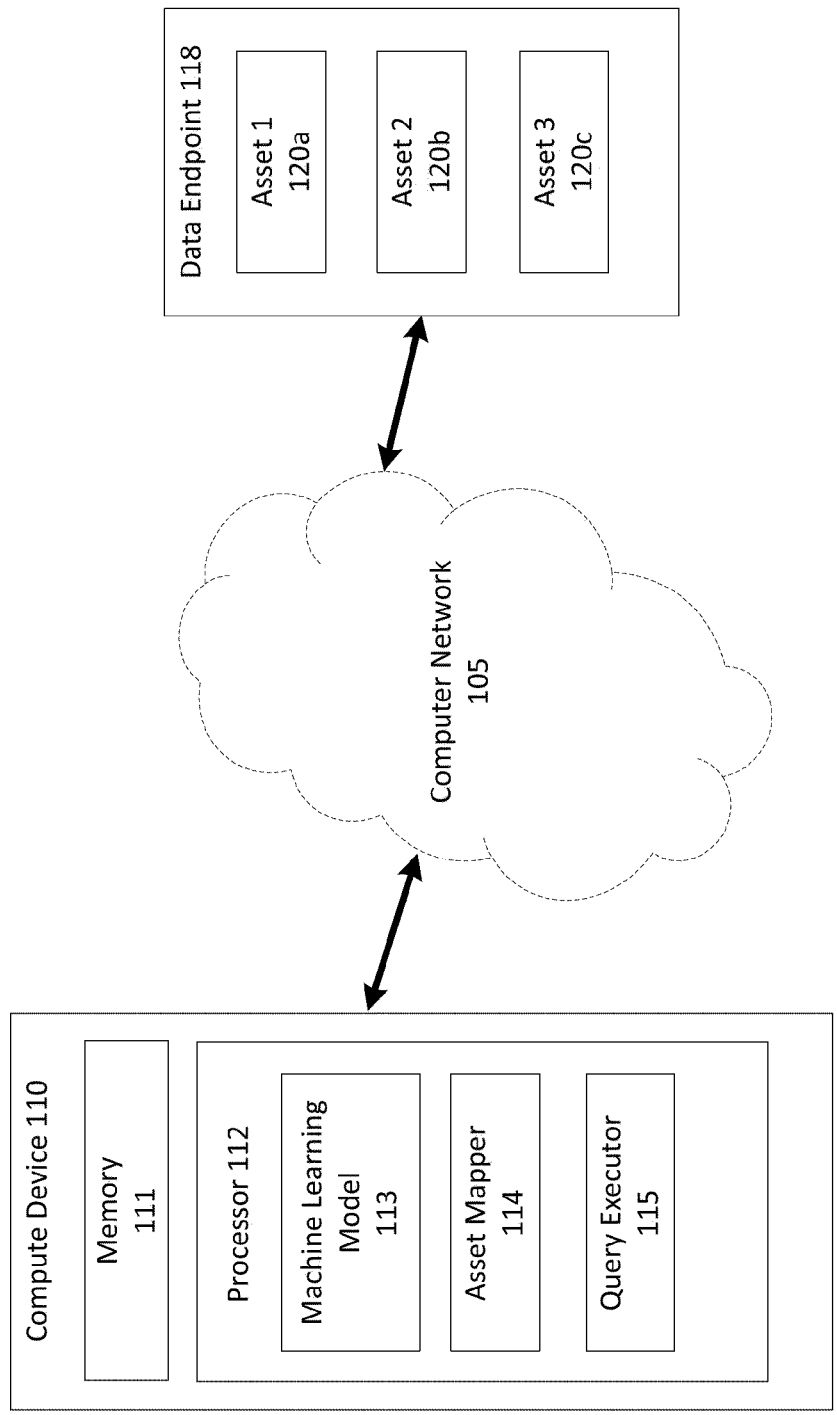
FIG. 1 is a schematic block diagram of a data structure generation system 100, according to an embodiment.

In some embodiments, a method includes extracting metadata associated with a set of assets from a set of electronic sources. The method further includes providing the metadata to a machine learning model to define a tree data structure including a leader subtree and a follower subtree that is linked to and dependent upon a portion of a hierarchical classification structure of the leader subtree. The hierarchical classification structure includes internal classification nodes and external classification nodes. The portion of the hierarchical classification structure includes the internal classification nodes of the leader subtree and excludes the external classification nodes of the leader subtree, and both the leader subtree and the follower subtree are linked to a common root node. The method further includes matching the metadata to attributes assigned to classification nodes within the tree data structure to map the set of assets into data nodes of the tree data structure. The method further includes receiving a query for an asset from the set of assets. The query includes a query attribute. The method further includes parsing the query to traverse the tree data structure to locate the asset based at least in part on the query attribute and at least one of the attributes assigned to the classification nodes. The method further includes, after and/or in response to parsing the query, sending a signal representing the asset and/or a location of the asset.

In some embodiments, a method includes extracting metadata associated with a set of assets from a set of electronic sources. The method further includes providing the metadata to a machine learning model to define a tree data structure including a leader subtree and a follower subtree that is linked to and dependent upon a portion of a hierarchical classification structure of the leader subtree. The hierarchical classification structure includes internal classification nodes and external classification nodes. The portion of the hierarchical classification structure includes the internal classification nodes of the leader subtree and the external classification nodes of the leader subtree, and both the leader subtree and the follower subtree are linked to a common root node. The method further includes matching the metadata to attributes assigned to classification nodes within the tree data structure to map the set of assets into data nodes of the tree data structure. The method further includes receiving a query for an asset from the set of assets. The query includes a query attribute. The method further includes parsing the query to traverse the tree data structure to locate the asset based at least in part on the query attribute and at least one of the attributes assigned to the classification nodes. The method further includes, after and/or in response to parsing the query, sending a signal representing the asset and/or a location of the asset.

In some embodiments, a method includes extracting metadata associated with a set of assets from a set of electronic sources (e.g., databases, internet-of-things (IOT) devices, end points, streaming end points (e.g., for multimedia assets), network folders, etc.). The metadata is then provided to a machine learning model to define a tree data structure. The tree data structure includes a leader subtree and a follower subtree that is linked to and dependent upon both internal classification nodes and external classification nodes of the leader subtree. The follower subtree includes classification nodes defined by the machine learning model. The method further includes matching the metadata to attributes assigned to the classification nodes of the leader subtree and the classification nodes of the follower subtree to map the set of assets into data nodes of the tree data structure. The method further includes receiving a query for an asset from the set of assets. The query includes a query attribute. The query is then parsed to traverse the tree data structure to locate the asset based at least in part on the query attribute and at least one of the assigned attributes. The method further includes adding an indication of the query to a distributed ledger.

As used herein, a component and/or a device can be, for example, any assembly and/or set of operatively-coupled electrical components associated with performing a specific function, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "device" is intended to mean a single device or a combination of devices. For instance, a "network" is intended to mean a single network or a combination of networks.

As used herein, the term "or" or "and/or" is used as a function word to indicate that two words or expressions are to be taken together or individually. The terms "comprising," "having," "including," and "containing" are to be construed as open-ended terms (i.e., meaning "including, but not limited to").

FIG. 1 is a schematic block diagram of a data structure generation system 100, according to an embodiment. As shown, the data structure generation system 100 includes a compute device 110 communicatively coupled to a data endpoint 118 via a computer network 105. The compute device 110 can be a hardware based computing device and/or a multimedia device, for example, a server, a smartphone, a tablet, a laptop, and/or the like. The compute device 110 includes a memory 111 and a processor 112.

The memory 111 can be any suitable device able to store computer files, instructions, program and/or application code, data, and/or the like. The memory 111, for example, can be a hardware based integrated circuit (IC), a random access memory (RAM), a memory buffer, a hard drive, a read-only memory (ROM), an erasable programmable read-only memory (EPROM), and/or the like. In some implementations, the memory 111 can be a portable memory (for example, a flash drive, a portable hard disk, and/or the like) that can be operatively coupled to the processor 112. The memory 111 can store, for example, one or more software modules and/or code that can include instructions to cause the processor 112 to perform one or more processes, functions, and/or the like. The memory 111 can be used to store data received and/or extracted from the data endpoint 118 (and/or other electronic sources), as described in further detail herein.

The processor 112 can be configured to execute instructions stored in the memory 111. The processor 112 can be, for example, a hardware based integrated circuit (IC) or any other suitable processing device configured to run and/or execute a set of instructions or code. For example, the processor 112 can be a general purpose processor, a central processing model (CPU), an accelerated processing model (APU), an application specific integrated circuit (ASIC), a field programmable gate array (FPGA), a programmable logic array (PLA), a complex programmable logic device (CPLD), a programmable logic controller (PLC) and/or the like. The processor 112 is operatively coupled to the memory 111, and such coupling can be accomplished in any suitable manner, such as, for example, through a system bus (e.g., address bus, data bus, control bus, etc.).

The processor 112 includes a machine learning model 113, an asset mapper 114, and a query executor 115. In some instances, the machine learning model 113 can be a program and/or software code stored in the memory 111 and executable by the processor 112. In other instances, the machine learning model 113 can be a dedicated hardware-based IC. In such other instances, the hardware-based machine learning model 113 can be implemented using, for example, an ASIC, a CPLD, an FPGA, and/or the like. The machine learning model 113 can be any suitable type of machine learning model such as, for example, a neural network, a decision tree model, a random forest model, a deep neural network, a topic model, a deep learning model, and/or a hybrid model.

As described above, data governance within, for example, an enterprise or organization can be cost and labor intensive due at least in part to inconsistencies in how the data is managed, organized, classified, stored, shared, and/or accessed across the enterprise or organization. For example, a particular document (e.g., employee Jill's paystub) or document type (e.g., an employee paystub) may be stored within and/or associated with a first classification structure of a first department (e.g., the finance department) of the organization that is inconsistent with and/or otherwise different from a classification structure of a second department (e.g., the human resources department). Such disparity or lack of uniformity across the departments, and within the organization, can result in inefficient or unnecessarily excessive storage requirements (as will be described in more detail herein), inefficient querying and document retrieval, and the like. The machine learning model 113 can address these drawbacks. For example, the machine learning model 113 can be configured to analyze data and/or metadata to define a data structure that minimizes or otherwise optimizes data storage requirements, and provides for improved uniformity (e.g., uniformity in classification across the enterprise or organization), resulting in increased or otherwise optimized querying for data (e.g., organization documents, like employee Jill's paystub), as described in further detail herein.

The tree data structure can be initially formed by the machine learning model 113 based on a set of data (and/or metadata). The data or metadata can be in any suitable form and provided by any suitable source. For example, the machine learning model 113 can define the tree data structure based on one or more of the following: assets, industry standards, organization or enterprise standards, dictionaries, user input / suggestions, etc. Further, the machine learning model 113 can periodically redefine or otherwise modify the initially-formed tree data structure based on new learnings, and/or new instances of the above-identified factors, e.g., new assets or industry standards, to produce a modified tree data structure (e.g., a modified hierarchical classification structure).

Figure 2C:
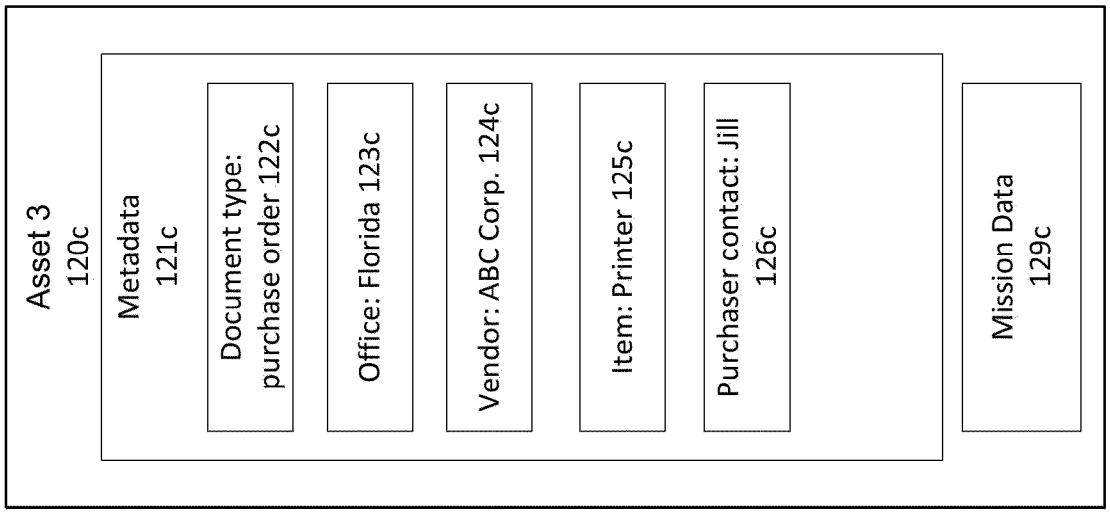
FIGS. 2a-2c are schematic block diagrams of assets used by the data structure system 100 of FIG. 1, according to an embodiment.
Figure 2B:
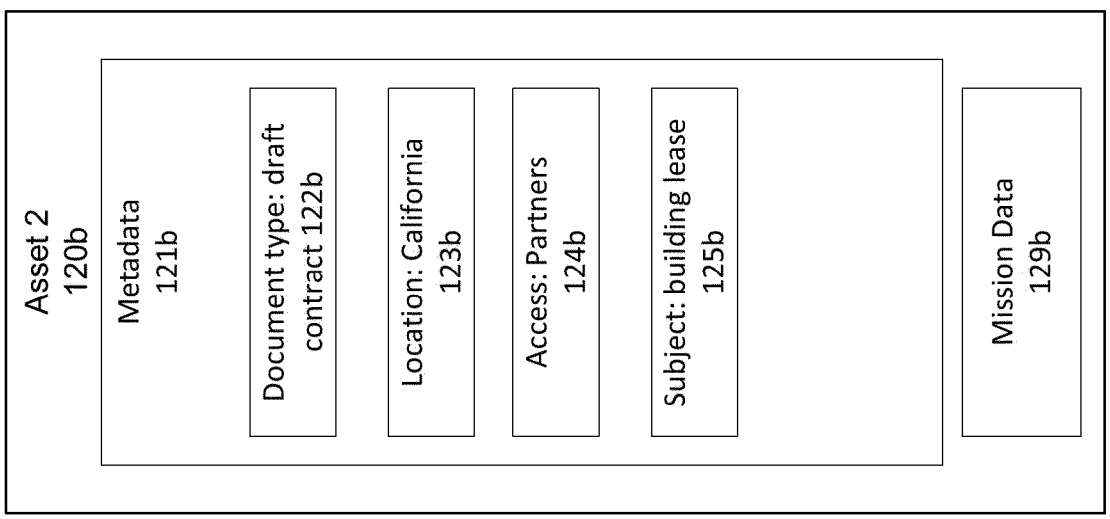
Figure 2A:
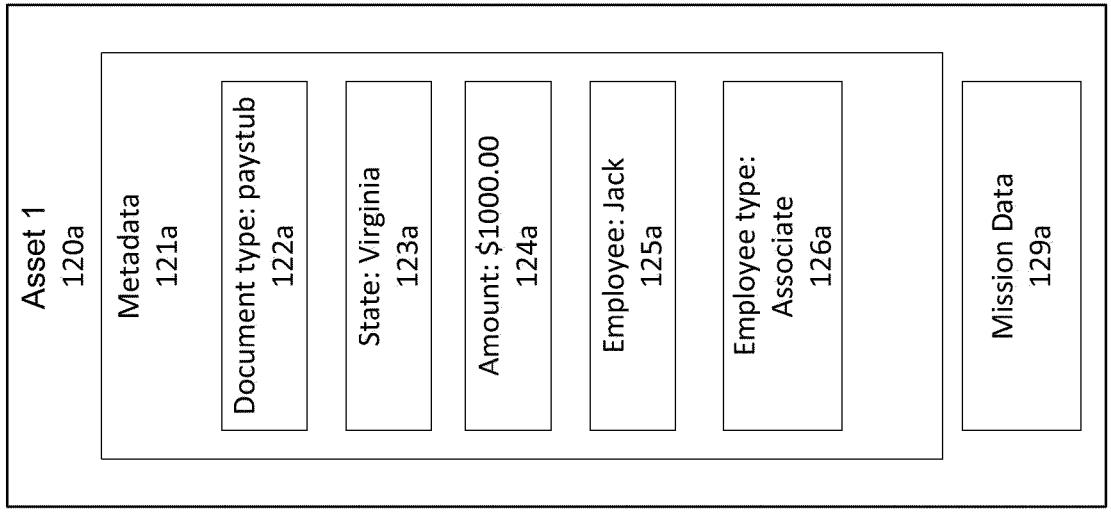
Figure 3:
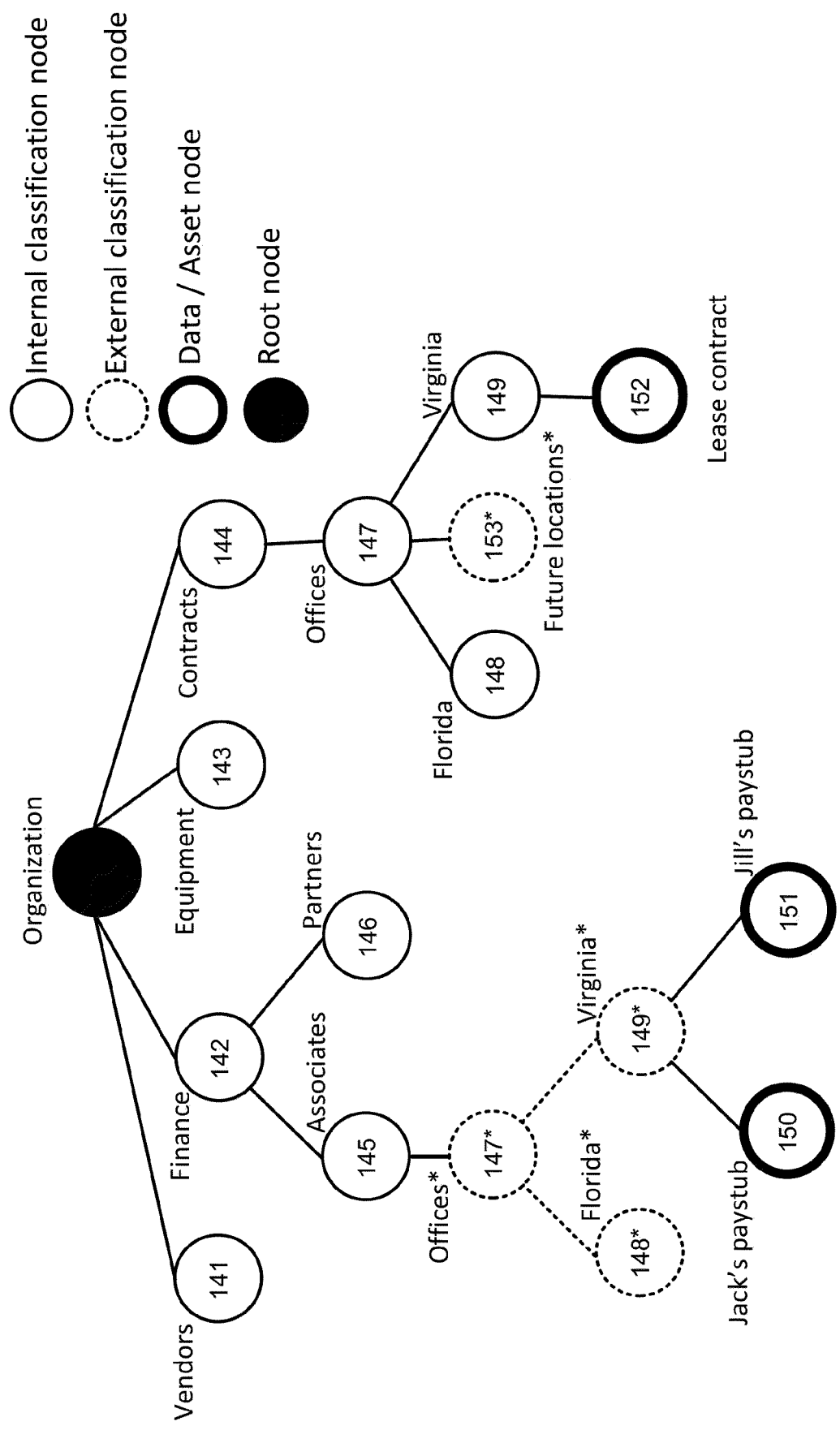
FIG. 3 is a schematic diagram of a tree data structure defined by the data structure system 100, according to an embodiment.

An example tree data structure is shown in FIG. 3. In this example, the tree data structure is for organization 140, and is defined at least in part based on asset 1 120a, asset 2 120b, and asset 3 120c (also collectively referred to in this embodiment as "the assets 120"), which as shown in FIG. 1, are stored at the data endpoint 118. Although each of the assets 120 is shown as being stored at the data endpoint 118, in other instances, any number of assets can be used to define a tree data structure and those assets can be located in any suitable combination across any suitable number of data endpoints or any other suitable electronic source (e.g., one or more assets can be stored at a first data endpoint while one or more other assets can be stored at a second data endpoint separate from and/or different from the first data endpoint). Said another way, a data endpoint can be any store of data, memory, database, or other suitable connection point(s) for a computer network through which data (e.g., metadata and/or mission data associated with assets) can be retrieved or to which a data connection can be set-up (e.g., in instances associated with streaming or ongoing data connection processes, pushing and/or pulling of data). In this example, as shown in FIGS. 2a-2c, each asset contains mission data and metadata; more specifically, as shown in FIGS. 2a-2c, respectively, asset 1 120a includes metadata 121a and mission data 129a, asset 2 120b includes metadata 121b and mission data 129b, and asset 3 120c includes metadata 121c and mission data 129c (the metadata 121a, 121b, and 121c are also referred to collectively herein as the metadata 121, and the mission data 129a, 129b, and 129c are also referred to collectively herein as the mission data 129). Metadata is typically defined as data about other data. As applied here, the metadata 121 is data about the mission data 129 (e.g., the metadata 121a is data about the mission data 129a). Further, the metadata 121 includes attributes and a value for each attribute.

More specifically, as shown in FIG. 2a, the metadata 121a of asset 1 120a includes attribute "Document type" and value "paystub" 122a, attribute "State" and value "Virginia" 123a, attribute "Amount" and value "$1000.00" 124a, attribute "Employee" and value "Jack" 125a, and attribute "Employee type" and value "Associate" 126a. In a similar fashion, as shown in FIG. 2b, the metadata 121b of asset 2 120b includes attribute "Document type" and value "draft contract" 122b, attribute "Location" and value "California" 123b, attribute "Access" and value "Partners" 124b, and attribute "Subject" and value "building lease" 125b. Further, in a similar fashion, as shown in FIG. 2c, the metadata 121c of asset 3 120c includes "Document type" and value "purchase order" 122c, attribute "Office" and value "Florida" 123c, attribute "Vendor" and value "ABC Corp." 124c, attribute "Item" and value "Printer" 125c, and attribute "Purchaser contact" and value "Jill" 126c.

The metadata 121 in this example is representative of variation or lack of uniformity across data (e.g., assets). For example, the metadata 121a includes State:Virginia 123a, the metadata 121b includes Location:California 123b, and the metadata 121c includes Office:Florida 123c. In this scenario, the attributes State, Location, and Office are all representative of geographies in which the organization 140 has a presence (e.g., the organization 140 has an office in Florida). The attributes (i.e., State, Location, Office), however, are not uniformly classified. Such non-uniformity can, as described above, limit the efficiency (e.g., an unnecessary amount of computing power may be required) associated with retrieving these assets. To promote uniformity, the machine learning model 113 can analyze the metadata 121 to define a tree data structure with suitable uniformity notwithstanding the variations in the metadata, e.g., the variation in attributes or values that could and/or should be classified together or otherwise considered effectively synonymous for classification purposes.

In use, for example, the machine learning model 113 can receive, retrieve, extract, or otherwise obtain the assets 120 (including the metadata 121 and/or the mission data 129 associated with those assets 120, and/or data representative of those assets 120). In this embodiment, the machine learning model 113 can obtain data from the data endpoint 118 via the computer network 105. In some instances, that data, or a portion thereof, can be stored (at least temporarily) in the memory 111. The machine learning model 113 can then define the tree data structure based on the obtained data. In some instances, the machine learning model 113 can define the tree data structure based on both the mission data 129 and the metadata 121, while in other instances, the machine learning model 113 can define the tree data structure based on the metadata 121 and not the mission data 129. In such instances, for example, the machine learning model 113 may not have access to the mission data 129, e.g., the mission data 129 may contain sensitive information and/or be confidential, and as such, not accessible to the compute device 110. Further, in such instances, the machine learning model 113 can extract the metadata 121 from the assets 120 and use the metadata 121 to define the tree data structure. Such a tree data structure is illustrated schematically in FIG. 3.

As shown in FIG. 3, the tree data structure is formed of a root node and a set of subtrees (leader and follower, as described in further detail herein) that are made up of classification nodes (internal and external, as described in further detail herein), with asset nodes attached / linked thereto (as described in further detail herein). Referring to the first level of nodes just below the organization 140 root node, the machine learning model 113 has determined based on the metadata 121 to classify four internal classification nodes, i.e., vendors 141, finance 142, equipment 143, and contracts 144, each of which can serve as a parent node within a subtree of the overall tree data structure. For simplicity, only the finance node 142 and the contracts node 144 are shown and described as having children nodes and as a result, subtrees, but it should be understood that in other instances any number and/or combination of nodes can be used to form the tree data structure (e.g., the vendors node 141 and/or the equipment node 143 can have any suitable number of children nodes).

The machine learning model 113 can develop this classification structure in any suitable manner. The machine learning model 113, for example, can be configured to find correlations in data and/or metadata to generate a classification structure. In some instances, for example, the machine learning model 113 can find similarities in data and/or metadata across various assets and/or electronic sources to group that data and/or metadata and define a classification structure (e.g., a tree data structure). The machine learning model 113 can be trained, for example, in accordance with supervised label standards, unsupervised techniques, and/or with feedback (e.g., user-provided feedback).

Here, referring to FIGS. 1-3, for example, the machine learning model 113 may determine to define the finance 142 node based at least in part on one or more of the following metadata 121: "Document type: paystub" 122a, "Amount: $1000.00" 124a, "Document type: purchase order" 122c, because this portion of the metadata 121 is determined by the machine learning model 113 to be associated with finance. This is a simplified example for ease of explanation, but it should be understood that the machine learning model 113 can use any portion and/or any combination of the metadata 121 in any suitable manner to define a tree data structure. Also, although in this implementation the machine learning model 113 defined the tree data structure shown in FIG. 3 based only on the metadata 121 from the assets 120, in other implementations, the machine learning model 113 can incorporate any suitable additional data (e.g., industry standards, organization / enterprise standards, mission data, user-input, and the like) into its analysis and subsequent formation of a tree data structure (an example of such an alternative implementation is shown in and described with respect to FIG. 4).

As described above and in more detail below, the machine learning model 113 can be configured to define a tree data structure to limit, minimize, or otherwise optimize storage requirements associated with the tree data structure, promote uniformity in part to achieve the same, and provide for efficient updating capabilities. To achieve these benefits, the tree data structure is defined using leader subtrees and follower subtrees, having a combination of internal classification nodes and external classification nodes that refer to, are linked to, and/or are dependent upon the internal classification nodes. Said another way, a subtree (e.g., a follower subtree), or a portion thereof, can be linked to and dependent upon another subtree (e.g., a leader subtree), or a portion thereof. In this manner, a classification structure of a subtree can be managed in a single location, and any updates to the classification structure in that single location can be effectively distributed to other subtrees (follower subtrees) through the tree data structure.

For example, as shown in FIG. 3, just below the finance node 142 is an associates node 145 and a partners node 146, and just below the associates node 145 is a follower subtree (including three internal classification nodes, including offices* node 147*, Florida* node 148*, and Virginia* node 149*) that refers to and is dependent upon a leader subtree (including three internal classification nodes, including offices 147, Florida 148, and Virginia 149, and one external classification node, future locations* 153* (which refers to a leader subtree not shown in FIG. 3)). Note that in this embodiment the follower subtree is linked to and dependent upon only internal classification nodes from the leader subtree. In this manner, neither external classification nodes (here, i.e., future locations* node 153*) of the leader subtree nor assets attached or linked to the leader subtree (here, i.e., lease contract 152) are linked to and/or have a dependent relationship with the follower subtree. So, if for example an asset is added to Florida 148, the follower subtree, including the external classification Florida* node 148* would not be impacted. If, however, an internal classification node is added to the leader subtree, an external classification node would be added to the follower subtree, and linked to and dependent upon the newly-added internal classification node. For example, if the organization adds an office in Maryland, a new Maryland internal classification node just under the Offices node 147 (i.e., added to the leader subtree) may be added to the tree data structure, and the change can be propagated to the follower subtree such that a Maryland external classification node is added just under the Offices* node 147*. If, however, in another example, the new Maryland node is added to the Future locations 153 internal classification node of its respective leader subtree (not shown), such a change would not be propagated to the Offices* 147* follower subtree. In some instances, in response to an update to a leader subtree, a signal and/or alert can be sent, e.g., to an administrator of the tree data structure, indicating an update to or modification of the leader subtree and the impact of such an update or modification on any follower subtrees.

In some embodiments, a follower subtree need not be constrained to being linked to and/or dependent upon only internal classification nodes from the leader subtree. For example, as described in further detail herein with respect to FIG. 6, the follower subtree can also include external classification nodes from the leader subtree. Further, in some embodiments, e.g., independent from whether or not the external classification nodes from the leader subtree are linked to the follower subtree, one or more of the assets attached or linked to the leader subtree are linked to and/or have a dependent relationship with the follower subtree. In this manner, an asset can be accessed from more than one portion of the tree data structure of the organization. So, referring to FIG. 6, in such embodiments, for example, the lease contract 152 that attached or linked to Virginia 149 could also be attached or linked to Virginia* 149*, e.g., and referred to as lease contract* 152* within the follower subtree. In some implementations, a revision to lease contract 152 would be propagated to the lease contract* 152*, and/or vice versa.

Further, to properly and efficiently map the assets to the tree data structure, the machine learning model 113 of FIG. 1 can be configured to use any of the available information (e.g.. the metadata, the mission data, industry standards, organization / enterprise standards, user input, and/or the like) to define and assign attributes to the classification nodes of the tree data structure. In some instances, the machine learning model 113 can be configured to use only the metadata to define and/or assign attributes, while in other instances the machine learning model 113 can be configured to use any suitable combination of the available information (e.g., metadata and user input, but not mission data, or metadata, mission data, and user input). As described further below, these attributes can be used to assist in mapping the assets to the appropriate asset / data nodes within the tree data structure. In some implementations, one or more of the attributes assigned to the classification nodes can be modified or reassigned (and/or new attributes can be assigned) in response to user-input (e.g., user-input to directly modify the attributes or user-input to modify the machine learning model 113, which will in turn modify or reassign attributes). Further, in some instances, updates to attributes assigned to classification nodes can utilize the links between the leader subtrees and the follower subtrees to promote uniformity and efficiency in the updates, e.g., in response to user-input representing an instruction to modify or add an attribute assigned to an internal classification node of a leader subtree, the addition or modification of the attribute can be propagated to one or more follower subtrees such that the attribute(s) is added or modified at one or more external classification nodes of the one or more follower subtrees.

As described above, the processor 112 further includes the asset mapper 114. In some instances, the asset mapper 114 can be a program and/or software code stored in the memory 111 and executable by the processor 112. In other instances, the asset mapper 114 can be a dedicated hardware-based IC. In such other instances, the hardware-based asset mapper 114 can be implemented using, for example, an ASIC, a CPLD, an FPGA, and/or the like.

The asset mapper 114 can be configured to map assets (e.g., assets 120) to the tree data structure, and/or define and provide suggested locations within the tree data structure at which each asset should be mapped. For example, the asset mapper 114 can be configured to compare, match, or otherwise associate each asset to one or more attributes assigned or otherwise associated with nodes within the tree data structure.

The assets mapped by the asset mapper 114 can be the same assets that are used by the machine learning model 113 to define the tree data structure, and/or different assets. As shown in FIG. 3, Jack's paystub and Jill's paystub are both mapped to Virginia* node 149*, and lease contract 152 is mapped to Virginia 149. Similar to the machine learning model 113, the asset mapper 114 can be configured to map assets based on any suitable available information. For example, in some instances, the asset mapper 114 can be configured to map assets based on metadata and not mission data (e.g., in such instances the mission data may include sensitive and/or confidential information, and/or may not be accessible to the asset mapper 114). Further, using metadata and not mission data associated with assets may in some instances require less computing power and time (compared to mission data also being used in the mapping analysis), thereby increasing efficiency in mapping assets to the tree data structure.

The asset mapper 114 can obtain the metadata in any suitable manner and from any suitable source. For example, in some instances, the asset mapper 114 can extract the metadata 121 from the assets 120 stored at the data endpoint 118, while in other instances, the asset mapper 114 can obtain the metadata 121 from other sources, such as, for example, from the memory 111 and/or other devices, memories, and/or data endpoints operatively coupled to the compute device 110. In use, for example, once the asset mapper 114 has obtained or otherwise has access to the metadata 121, the asset mapper 114 can compare and/or match the metadata 121 or any portion thereof to one or more data / asset nodes within the tree data structure. Referring to Jack's paystub asset node 150 in FIG. 3, for example, the asset mapper 114 has mapped the Jack's paystub asset to the Jack's paystub data / asset node 150 based on one or more attributes assigned to or otherwise associated with one or more of the classification nodes that are parent nodes to Jack's paystub data / asset node 150. Similarly stated, the asset mapper 114, in this instance, has analyzed the metadata associated with the Jack's paystub asset 150 and matched it to one or more attributes within the tree data structure (e.g., one or more attributes assigned to the Virginia* node 149*) to determine that the Jack's paystub asset 150 should be mapped just below the Virginia* node 149*.

Although in the above example the asset mapper 114 is described as using metadata and attributes to map assets, in other instances, the asset mapper 114 can be configured to use any suitable additional information to determine locations within the tree data structure at which to map assets. For example, additional information can include one or more of the following: industry standards, organization / enterprise standards, mission data, user-input, and/or the like.

In some instances, the asset mapper 114 can use or otherwise coordinate with the machine learning model 113 to map assets to the tree data structure. In this manner, any suitable machine learning technique(s) can be used to map assets to the tree data structure. With the tree data structure defined, and the assets mapped thereto, the tree data structure can then be traversed to locate and/or retrieve or otherwise obtain the mapped assets.

As described above, the processor 112 further includes the query executor 115, which can be configured to receive and manage queries for mapped assets. In some instances, the query executor 115 can be a program and/or software code stored in the memory 111 and executable by the processor 112. In other instances, the query executor 115 can be a dedicated hardware-based IC. In such other instances, the hardware-based query executor 114 can be implemented using, for example, an ASIC, a CPLD, an FPGA, and/or the like. Although in this embodiment the machine learning model 113, the asset mapper 114, and the query executor 115 are shown at the compute device and shown separately, in some embodiments the functionality provided by each of the machine learning model 113, the asset mapper 114, and the query executor 115 can be combined into a single entity and/or can be distributed across various compute devices, processors, and/or memories. Said another way, the functionality described with respect to the compute device 110, can, in some embodiments, be distributed in any suitable manner.

The query executor 115 can be configured to receive a query (e.g., from a user) for an asset. The query executor 115 can be configured to parse the query to traverse the tree data structure to locate the asset. In some instances, the query executor 115 can compare, match, or otherwise associate the query with one or more attributes assigned to or otherwise associated with one or more nodes within the tree data structure to locate the asset requested by the query. In some instances, the query can include a query attribute. In such instances, the query executor 115 can locate the asset requested by the query based at least in part on the query attribute and one or more attributes assigned to or otherwise associated with one or more nodes within the tree data structure. The query executor 115, for example, can compare, match, or otherwise associate the query attribute (or in other instances, multiple of query attributes) with one or more attributes assigned to one or more nodes within the tree data structure. In some instances, the query executor 115 can use or otherwise coordinate with the machine learning model 113 to analyze the query, the query attributes, and/or the attributes assigned to the nodes within the tree data structure to locate the asset requested by the query. In this manner, any suitable machine learning technique(s) can be used to help locate the asset(s) requested by the query.

As shown in FIG. 1, the compute device 110 is connectable to the computer network 105 and the data endpoint 118 via the computer network 105. The computer network 105 can be any suitable network, such as, for example, the Internet, an intranet, a local area network (LAN), a wide area network (WAN), a metropolitan area network (MAN), a worldwide interoperability for microwave access network (WiMAX®), an optical fiber (or fiber-optic)-based network, a virtual network, and/or any combination thereof. The compute device 110 can be configured to receive data (e.g., from the data endpoint 118 and/or any other source or device associated with and/or coupled to the computer network 105) from the computer network 105 and store the data in the memory 111 and/or process the data with the processor 112, as described in further detail herein.

Additionally, in some instances, an indication of the query can be added (e.g., in response to the query and/or in response to locating and/or obtaining an asset requested by the query) to a distributed ledger for efficient record keeping. This indication can be added, for example, by the query executor 115, and/or any other suitable component of the compute device 110. Further, in some instances, the query executor 115, or other suitable component of the compute device 110, can define a block and link the block to a blockchain, thereby providing or enhancing trust and auditability of queries and changes.

Although embodiments described herein include external classification nodes of a leader subtree that are not linked to and/or do not have a dependent relationship with the follower subtree, in some embodiments, one or more of the external classification nodes of the leader subtree are linked to and/or do have a dependent relationship with the follower subtree. Using an example similar to the examples described with respect to FIG. 3, FIG. 6 illustrates a schematic diagram of a tree data structure defined by a data structure system (e.g., similar to or the same as any of the data structure systems described herein) that is similar to the tree data structure of FIG. 3, but includes a linkage and/or dependent relationship of external classification nodes from leader subtrees to follower subtrees, according to an embodiment.

Figure 6:
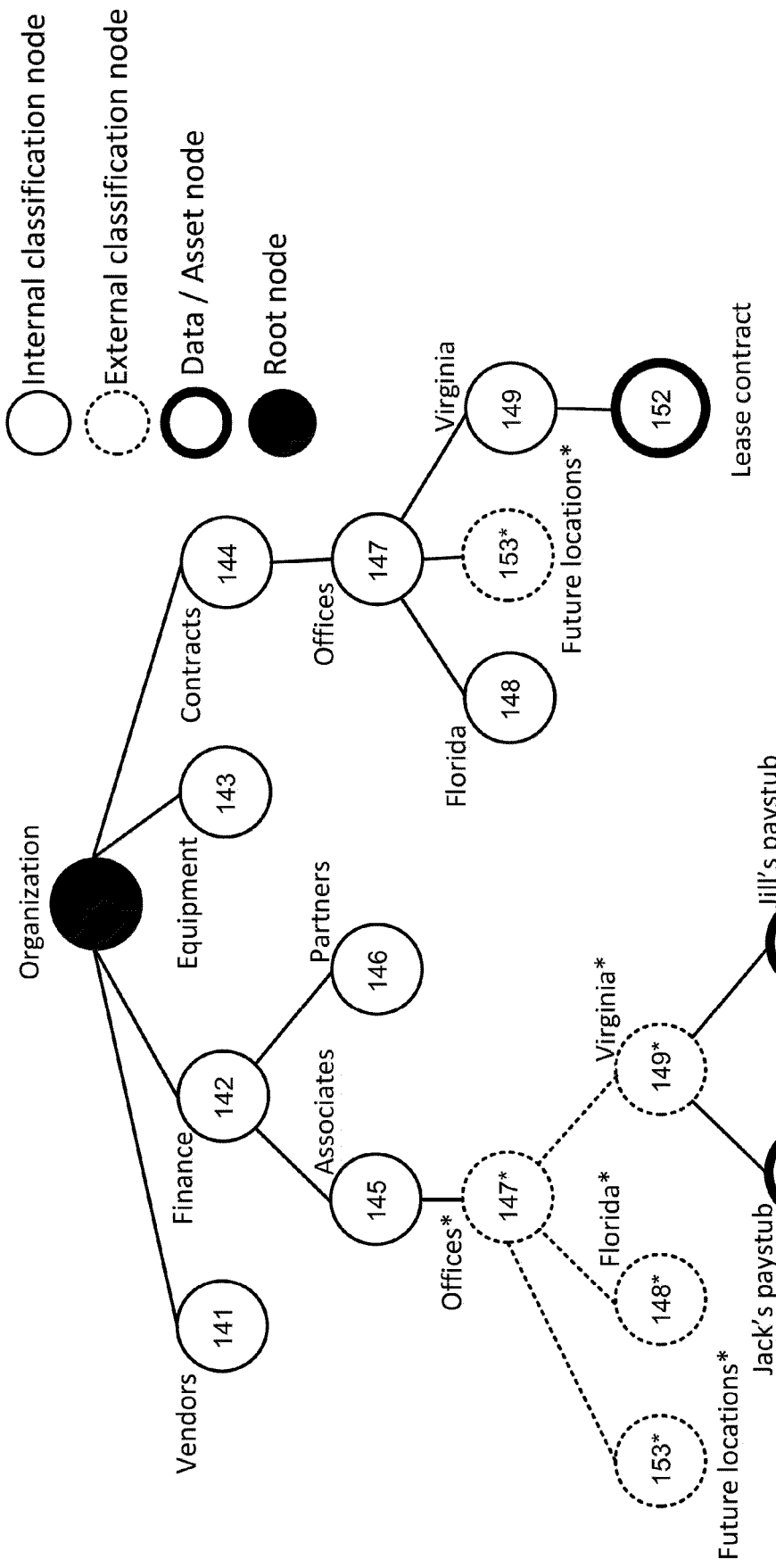
FIG. 6 is a schematic diagram of a tree data structured defined by a data structure system, according to an embodiment.

In this embodiment, and referring to FIG. 6, the follower subtree that refers to and is dependent upon the leader subtree (including three internal classification nodes, including offices 147, Florida 148, and Virginia 149, and one external classification node, future locations* 153 (which refers to a leader subtree not shown in FIG. 6)), includes not only the three internal classification nodes, including offices 147, Florida 148, and Virginia 149, but also includes the external classification node, future locations* 153. Accordingly, as shown in FIG. 6, the future locations* 153* external classification node of the leader subtree is also included as an external classification node of the follower subtree (as shown to the immediate left of the Florida* 148* external classification node).

Similar to the example described with respect to FIG. 3, even in the embodiment of FIG. 6, assets attached or linked to the leader subtree (e.g., lease contract 152) are not linked to and/or do not have a dependent relationship with the follower subtree. So, in this embodiment, if for example an asset is added to Florida 148, the follower subtree, including the external classification Florida* node 148* would not be impacted. If, however, an internal classification node and/or an external classification node are added to the leader subtree, an external classification node would be added to the follower subtree, and linked to and dependent upon the newly-added internal and/or external classification nodes.

For example, if the organization adds an office in Maryland, a new Maryland internal classification node just under the Offices node 147 (i.e., added to the leader subtree) may be added to the tree data structure, and the change can be propagated to the follower subtree such that a Maryland external classification node is added just under the Offices* node 147*. Further, if the new Maryland node is added to the Future locations 153 internal classification node of its respective leader subtree (not shown), such a change would propagate to the Offices* 147* follower subtree. In some instances, in response to an update to a leader subtree, a signal and/or alert can be sent, e.g., to an administrator of the tree data structure, indicating an update to or modification of the leader subtree and the impact of such an update or modification of any follower subtrees. Other structural and/or functional features of the embodiment described with respect to FIG. 6 can be the same as or similar to the structure and/or functional features of other embodiments described herein (e.g., those described with respect to FIG. 3), so those structure and/or functional features are not repeated herein with respect to FIG. 6.

Figure 4:
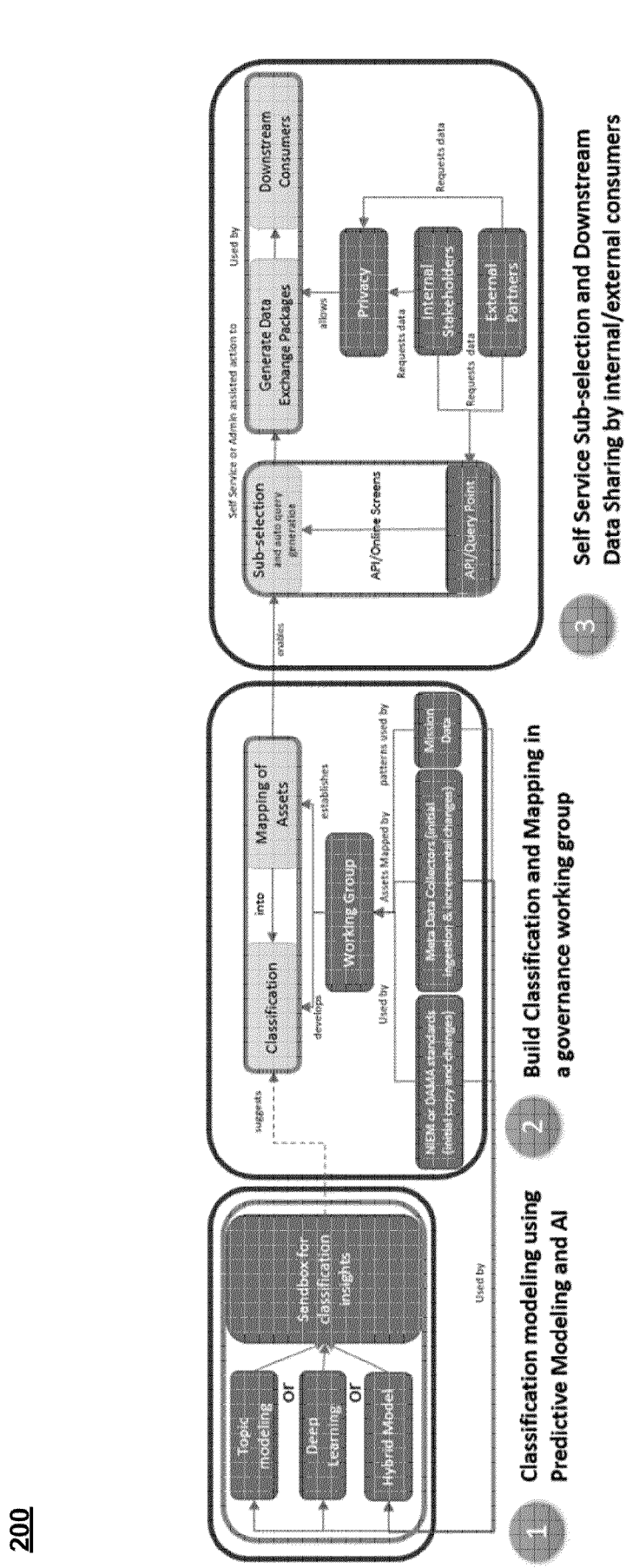
FIG. 4 is a schematic block flow diagram associated with a data structure system 200, according to another embodiment.

FIG. 4 is a schematic block flow diagram associated with a data structure generation system 200, according to an embodiment. The data structure generation system 200 can be the same or similar in structure and/or function to any of the data structure systems described herein (e.g., data structure generation system 100), and therefore, various features of the data structure generation system 200 are not described in detail with reference to FIG. 4. For example, the steps illustrated in and described with respect to FIG. 4 can be performed by a compute device that is the same or similar in structure and/or function to the compute device 110 (in FIG. 1).

As shown in FIG. 4, in this embodiment, the data structure generation system 200 is configured to perform classification modeling (box 1), then classification building and mapping via a governance group (box 2), followed by self-service sub-selection and downstream data sharing by internal and/or external users (box 3). As illustrated in box 1, predictive modeling and/or artificial intelligence, including topic modeling, deep learning, and/or a hybrid can be used to define (e.g., based on analysis of assets, or more specifically, metadata associated with those assets) classification insights or suggestions (e.g., represented as a tree data structure). With the classification defined, the classification can be modified with input from a working group (e.g., human intelligence), which as shown, can incorporate information including industry standards (e.g., National Information Exchange Model (NIEM) standard and/or Data Management Association International (DAMA) standard, banking standards, insurance standards, etc.) and/or organization or enterprise standards, metadata, dictionaries, and/or mission data. Additionally or alternatively, in some instances, this additional information and/or feedback can be used or incorporated in box 1, i.e., in the predictive modeling and/or artificial intelligence steps to define the classification.

Further, once the classification is defined and/or modified by the working group, the working group can map assets into a data structure defined according to the classification (e.g., into the tree data structure). With the assets mapped, the assets can then be located and/or obtained to enable data sharing between internal and external users. For example, assets can be queried, e.g., via an application program interface (API), such that the queried assets can be located and/or retrieved in response thereto. The queries can be defined and submitted by any suitable devices and parties (e.g., internal stakeholders, external partners, and the like). In some instances, privacy controls can be defined and implemented to limit and/or restrict access to certain assets and/or to limit and/or restrict particular parties from submitted queries or having their queries processed or otherwise successfully acted upon to obtain or locate the queried assets. In box 3 of FIG. 4, a sub-selector (e.g., code stored in memory and executed by a processor such as memory 111 and processor 112 shown and described with respect to FIG. 1) can be used for sub-selection (as indicated in box 3 of FIG. 4) of a subset of attributes and/or data assets from a collection of data assets mapped to the tree data structure. Such a sub-selection can include metadata and not mission data (e.g., in instances in which mission data access is restricted), or in other instances, the sub-selection can include a combination of the metadata and the mission data. The sub-selector can be used to create and/or define extracts / catalogs (e.g., in text or otherwise any consumable digital format) for reporting, auditing, and/or further downstream consumption and/ or processing by a department and/or person within an organization and/or digital software (e.g., business intelligence tools for data visualization or data processing tools for generating aggregated data and/or reports). In some implementations, the sub-selector can be used to set-up ongoing persistent / monitoring connections, e.g., in cases of continuously streaming assets such as an IOT device and/ or a real-time data source / data endpoint.

FIG. 5 is a flow chart illustrating a method 300 of defining and/or generating a tree data structure, and using the tree data structure to organize, locate, and/or share assets, according to another embodiment. The method 300 illustrated in and described with respect to FIG. 5 can be performed by any suitable device(s), such as, for example, the devices shown and described above with respect to the data structure generation system 100.

At 302, metadata associated with a set of assets from a set of electronic sources is extracted. At 304, the metadata is providing to a machine learning model to define a tree data structure including a leader subtree and a follower subtree that is linked to and dependent upon a portion of a hierarchical classification structure of the leader subtree. The hierarchical classification structure includes internal classification nodes and external classification nodes. The portion of the hierarchical classification structure includes the internal classification nodes of the leader subtree and excludes the external classification nodes of the leader subtree. Both the leader subtree and the follower subtree are linked to a common root node. At 306, the metadata is matched to attributes assigned to classification nodes within the tree data structure to map the set of assets into data nodes of the tree data structure. At 308, a query is received for an asset from the set of assets. The query includes a query attribute. At 310, the query is parsed to traverse the tree data structure to locate the asset based at least in part on the query attribute and at least one of the attributes assigned to the classification nodes. At 312, an indication of the query is added to a distributed ledger.

Although in this embodiment the follower subtree is linked to and dependent upon a portion of a hierarchical classification structure (including internal classification nodes and external classification nodes) of the leader subtree, and the portion of the hierarchical classification structure includes the internal classification nodes of the leader subtree and excludes the external classification nodes of the leader subtree, in some embodiments, the portion of the hierarchical classification structure includes one or more of the external classification nodes of the leader subtree.

In some embodiments, a method includes extracting metadata associated with a set of assets from a set of electronic sources (e.g., data endpoints, memories, and/or the like). The method further includes providing the metadata to a machine learning model to define a tree data structure that includes a leader subtree and a follower subtree that is linked to and dependent upon a portion of a hierarchical classification structure of the leader subtree. The hierarchical classification structure includes internal classification nodes and external classification nodes. The portion of the hierarchical classification structure includes the internal classification nodes of the leader subtree and excludes the external classification nodes of the leader subtree. Both the leader subtree and the follower subtree are linked to a common root node. The method further includes matching the metadata to attributes assigned to classification nodes within the tree data structure to map the set of assets into data nodes of the tree data structure. The method further includes receiving a query for an asset from the set of assets. The query includes a query attribute. The method further includes parsing the query to traverse the tree data structure to locate the asset based at least in part on the query attribute and at least one of the attributes assigned to the classification nodes. The method further includes, after parsing the query, sending a signal representing at least one of the asset or a location of the asset.

In some implementations, the machine learning model includes at least one of a neural network, a decision tree model, a random forest model, or a deep neural network.

In some implementations, the method further includes obtaining user input that includes instructions to modify the tree data structure, and then modifying the tree data structure based on the user input.

In some implementations, the step of providing the metadata to a machine learning model to define the tree data structure includes defining the tree data structure at a first time, and the method further includes modifying the tree data structure at a second time after the first time based on a user-provided indication of a change to the machine learning model to produce a modified tree data structure.

In some implementations, the step of defining the tree data structure includes defining the tree data structure based on at least one of National Information Exchange Model (NIEM) standard or Data Management Association International (DAMA) standard.

In some implementations, the method further includes receiving an instruction to add or modify an attribute assigned to an internal classification node of the leader subtree, and in response to the instruction, both adding or modifying the attribute to the internal classification node of the leader subtree and propagating the instruction to the follower subtree such that the attribute is added or modified at an external classification node of the follower subtree.

In some implementations, the step of defining the tree data structure does not include access to and/or use of mission data of the set of assets.

In some implementations, the step of matching the metadata to attributes assigned to classification nodes includes mapping an asset from the set of assets to a data node of the leader subtree and not mapping the asset to the follower subtree based on the matching.

In some implementations, the method further includes adding an indication of the query to a distributed ledger. In such implementations, in some instances, adding the indication includes defining a block and linking the block to a blockchain.

In some implementations, the method further includes receiving an instruction to modify the leader subtree, and in response to the instruction, modifying the leader subtree to produce a modified hierarchical classification structure, and in response to modifying the leader subtree, sending an alert to an administrator associated with the follower subtree indicative of the modified hierarchical classification structure and modifying the follower subtree in accordance with the instruction.

In some implementations, the method further includes updating an attribute assigned to an external classification node of the follower subtree based on an update to an attribute assigned to an internal classification node of the leader subtree.

In some implementations, the step of matching the metadata to map the set of assets into the tree data structure includes mapping a first asset from the set of assets to a data node of the leader subtree based on an attribute assigned to a classification node of the leader subtree, and mapping a second asset from the set of assets to a data node of the follower subtree based on an attribute assigned to a classification node of the follower subtree. The first asset is different from the second asset, and the mapping of the first asset to the data node of the leader subtree has no impact on any data node of the follower subtree.

In some implementations, the leader subtree includes an external classification node linked to and dependent upon a hierarchical classification structure of a third subtree that is different from both the leader subtree and the follower subtree, and the follower subtree does not include the hierarchical classification structure of the third subtree.

In some implementations, the step of matching the metadata to map the set of assets into the tree data structure excludes access to and use of mission data of the set of assets.

In some embodiments, a method includes extracting metadata associated with a set of assets from a set of electronic sources. The method further includes providing the metadata to a machine learning model to define a tree data structure including a leader subtree and a follower subtree that is linked to and dependent upon internal classification nodes of the leader subtree. The follower subtree includes internal classification nodes defined by the machine learning model. The method further includes matching the metadata to attributes assigned to the internal classification nodes of the leader subtree and to attributes assigned to the internal classification nodes of the follower subtree to map the set of assets into data nodes of the tree data structure. The method further includes receiving a query for an asset from the set of assets. The query includes a query attribute. The method further includes parsing the query to traverse the tree data structure to locate the asset based at least in part on the query attribute and at least one of the assigned attributes. The method further includes adding an indication of the query to a distributed ledger.

In some embodiments, a method includes extracting metadata associated with a set of assets from a set of electronic sources. The method further includes providing the metadata to a machine learning model to define a tree data structure including a leader subtree and a follower subtree that is linked to and dependent upon internal classification nodes of the leader subtree. The follower subtree includes internal classification nodes defined by the machine learning model. The method further includes matching the metadata to attributes assigned to the internal classification nodes of the leader subtree and to attributes assigned to the internal classification nodes of the follower subtree to map the set of assets into data nodes of the tree data structure. The method further includes receiving a query for an asset from the set of assets. The query includes a query attribute. The method further includes parsing the query to traverse the tree data structure to locate the asset based at least in part on the query attribute and at least one of the assigned attributes. The method further includes sending, in response to the query, a signal representing at least one of the asset or a location of the asset.

In connection with any of the embodiments described herein, in some implementations and/or instances, it is desirable to employ cycle detection and/or cycle prevention (also referred to herein as "cycle management"). Cycle management can include any structure, process, and/or algorithm suitable to identify whether a tree data structure (e.g., the tree data structures shown and described above) includes a cycle, the cycle being a pathway within the tree data structure that starts and ends at the same node. Cycle management as described below with respect to FIGS. 7A-10B can be performed by a processor of a compute device (such as processor 112 of compute device 110 of FIG. 1). For example, cycle management can be performed on tree data structures produced by and/or managed by such a compute device. Such cycle management can be performed, for example, periodically, on-demand in response to a command by a user, sporadically, when a new node is added or removed from a tree, when a new external classification node is referenced by a follower subtree, and/or at any other suitable time.

Figure 7A:
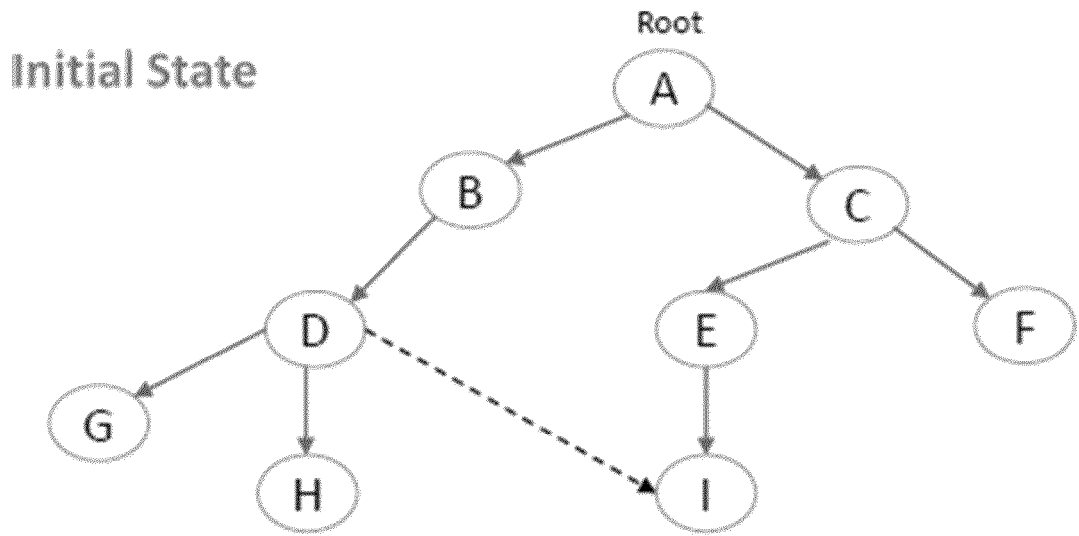
FIGS. 7A and 7B illustrate a tree data structure with no cycles, in an initial state and final state, respectively, with respect to a recursive leaflet node removal scheme.
Figure 7B:
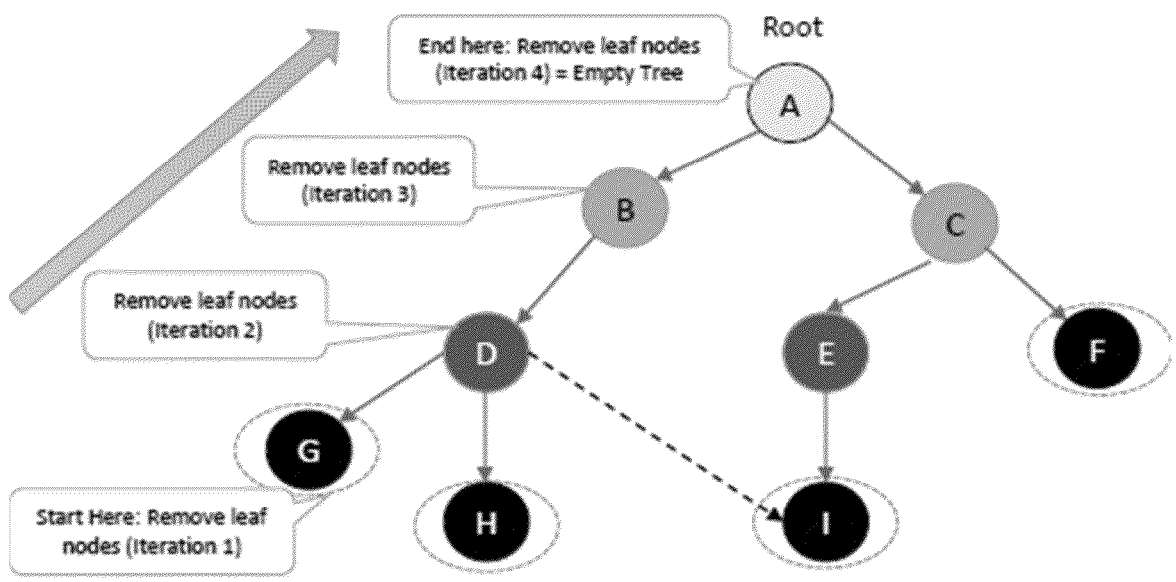

Cycle management, for example, can include a recursive leaf node removal scheme (also referred to herein as the "recursive scheme"). Use of a recursive leaflet node removal scheme is illustrated in and described with respect to FIGS. 7A and 7B. FIG. 7A illustrates a tree data structure in an initial state, and FIG. 7B illustrates that tree data structure in a final state, within the context of the recursive scheme. In some instances, the recursive scheme can, from the bottom of the tree, identify all leaf nodes and progress upwards for recursive elimination of leaf nodes. For example, all the end nodes G, H, I, and F can be identified. Then, all of those identified end nodes G, H, I, and F can be removed, resulting in a tree consisting of nodes A, B, C, D, and E. Next, all of the end nodes in the resulting tree can be identified. In this case, those end nodes are D and E. Similar to above, identified end nodes D and E can then be removed, resulting in a tree consisting of nodes B and C. Once again the remaining end nodes can be identified. In this case, those identified end nodes are B and C. Similar to above, the identified end nodes B and C can then be removed, resulting in a tree consisting of only node A. Further, all end nodes can be identified again, and in this case, only node A is identified. Continuing the process, all end nodes can again be removed. In this case, the only remaining end node is node A, and node A can be removed, resulting in a null or empty tree. Performing this process and reaching such a null or empty tree indicates that the tree shown in FIG. 7A in its initial state does not include a cycle.

Figure 8A:
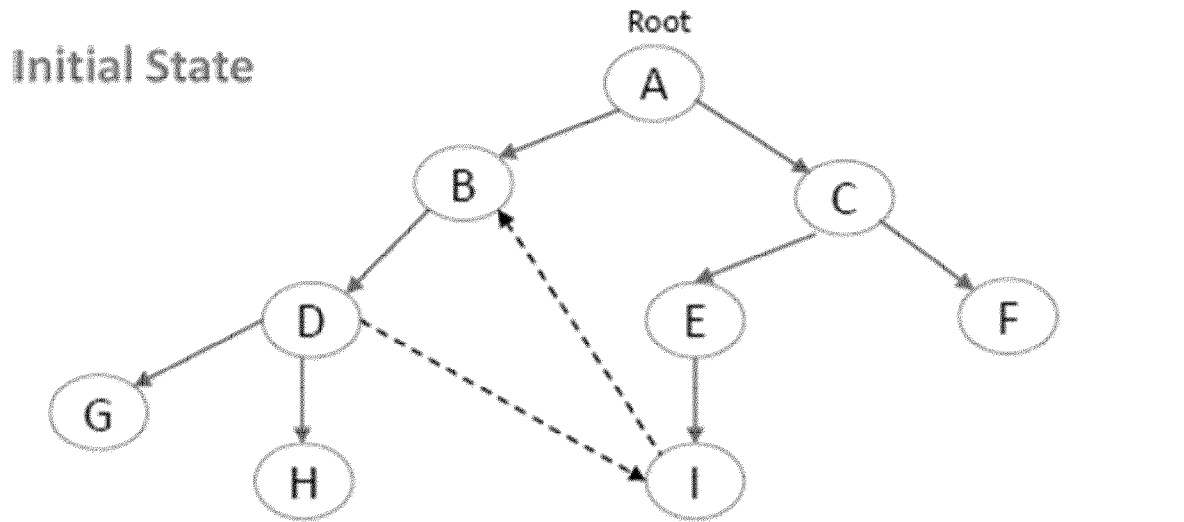
FIGS. 8A and 8B illustrate a tree data structure with a cycle, in an initial state and final state, respectively, with respect to a recursive leaflet node removal scheme.
Figure 8B:
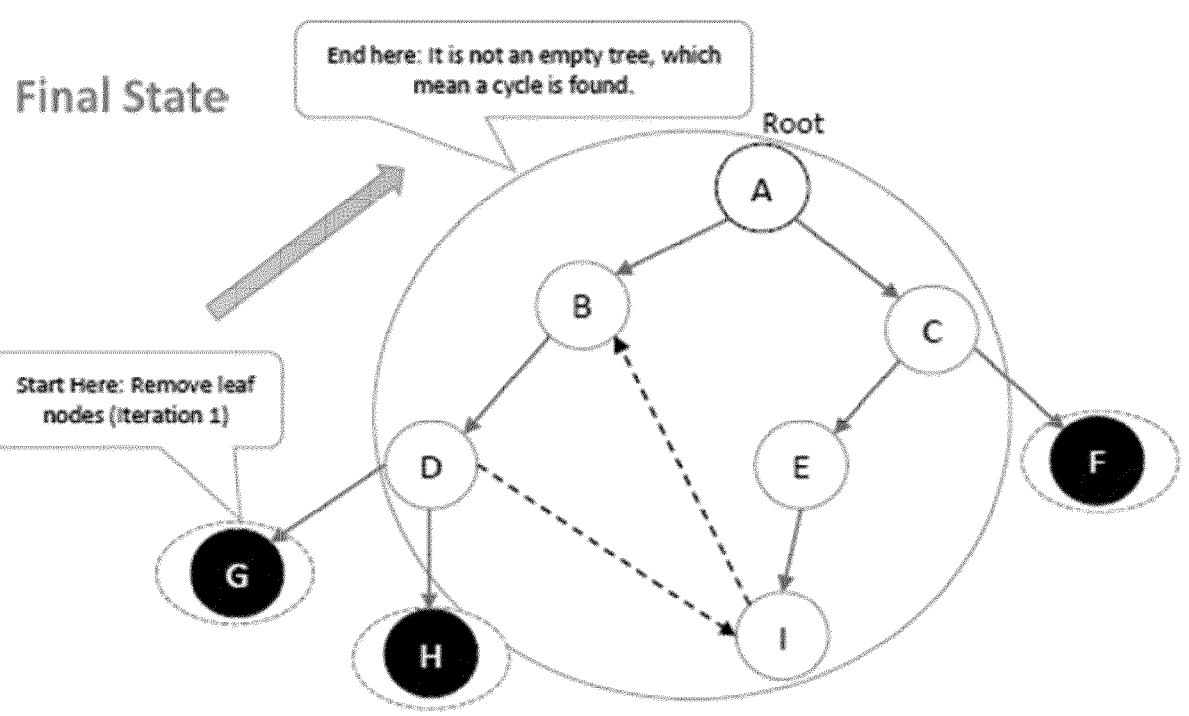

FIGS. 8A and 8B illustrate a similar tree data structure, in an initial state (FIG. 8A), and a final state (FIG. 8B), within the context of the recursive scheme, but in this example implementation, the tree data structure has a cycle. Similar to the example above with respect to FIGS. 7A and 7B, the recursive scheme includes identifying all end nodes. In this case, those end nodes are G, H, and F. Once identified, those end nodes are removed, and the resulting tree data structure consists of nodes A, B, C, D, E, and I. Once again, all leaf nodes of the resulting tree data structure can be identified. In this instance, however, no leaf nodes are present (all of the nodes A, B, C, D, E and I have a child node), and the tree data structure is not empty or null, thereby indicating presence of a cycle.

Figure 9A:
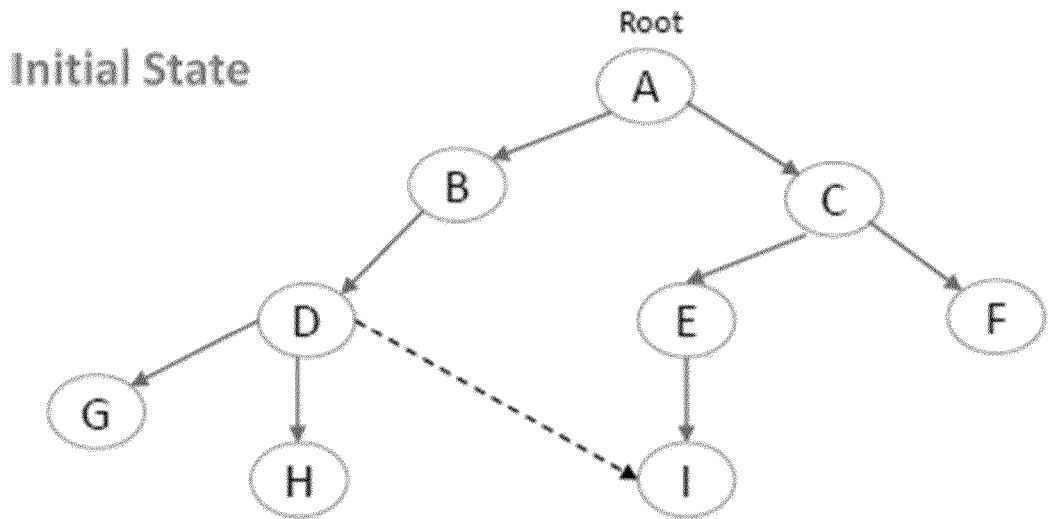
FIGS. 9A and 9B illustrate a tree data structure with no cycles, in an initial state and final state, respectively, with respect to a depth first search scheme.
Figure 9B:
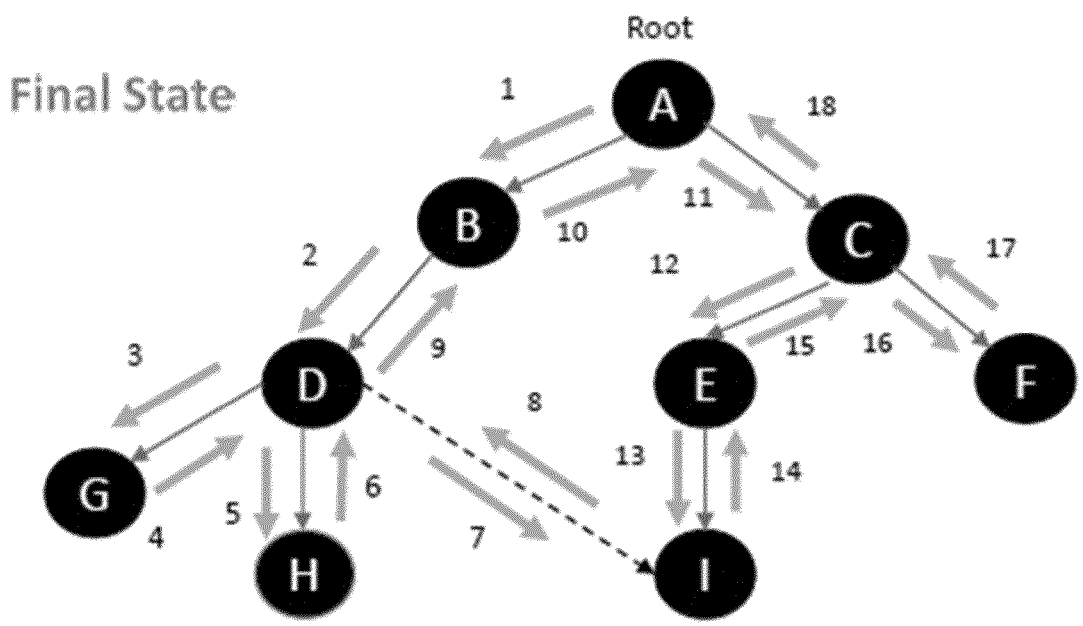

As another example, cycle management can include a depth first search ("DFS") scheme. Use of a DFS scheme is illustrated in and described with respect to FIGS. 9A and 9B. FIG. 9A illustrates a tree data structure in an initial state, and FIG. 9B illustrates that tree data structure in a final state, within the context of the DFS scheme. To confirm the absence of a cycle, forward movement along the tree data structure can always identify black or white nodes, while backward movement along the tree data structure should always identify grey nodes, as described in further detail herein.

In use, for example, the DFS scheme includes traversing forward from white colored root A to left most child B. Root A is marked grey. Further, white colored node B is marked grey and forward traversal continues to leftmost child D. Next, white colored node D is marked grey and forward traversal continues to leftmost child G, which is also a leaf node, and so as a leaf node, node G is marked black. Next, the scheme includes traversing backward to parent D, which is grey, to find any remaining white colored children (leftmost first). In this instance, node H is identified. Node H is a leaf node, and so is marked black. Further backward traversal continues to node D, and white leaf node I is identified, and as such, is marked black. Backward traversal continues, reaching parent node D, which is also marked black, resulting in the subtree starting at node D being completely marked black.

Next, backward traversal continues to node B, which is grey, and has no white children, so is marked black. Further backward traversal to node A indicates presence of white child nodes. From node A, the scheme includes traversing forward to node C, marking white child node C grey, and continuing to white node E, marking node E grey, and then reaching via forward traversal node I, which is already marked black. From there, the scheme includes backward traversal to grey node E, marking it black, and then traversing backwards to grey node C. From node C, the scheme includes traversing forward to white node F, and since node F is a leaf node, it is marked black. From here, the scheme includes backward traversal to node C, and with no white children, node C is marked black. Now, the subtree below node C is black. Further backward traversal fails to find any remaining white children from node A, and so node A is marked black. With all nodes marked black, it can be inferred that this tree data structure does not include a cycle.

Figure 10A:
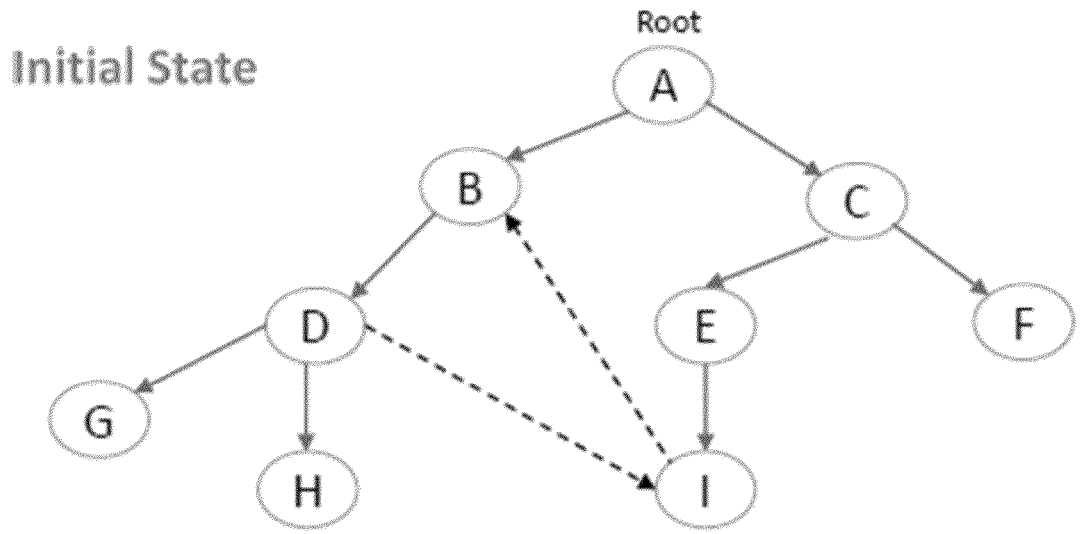
FIGS. 10A and 10B illustrate a tree data structure with a cycle, in an initial state and final state, respectively, with respect to a depth first search scheme.
Figure 10B:
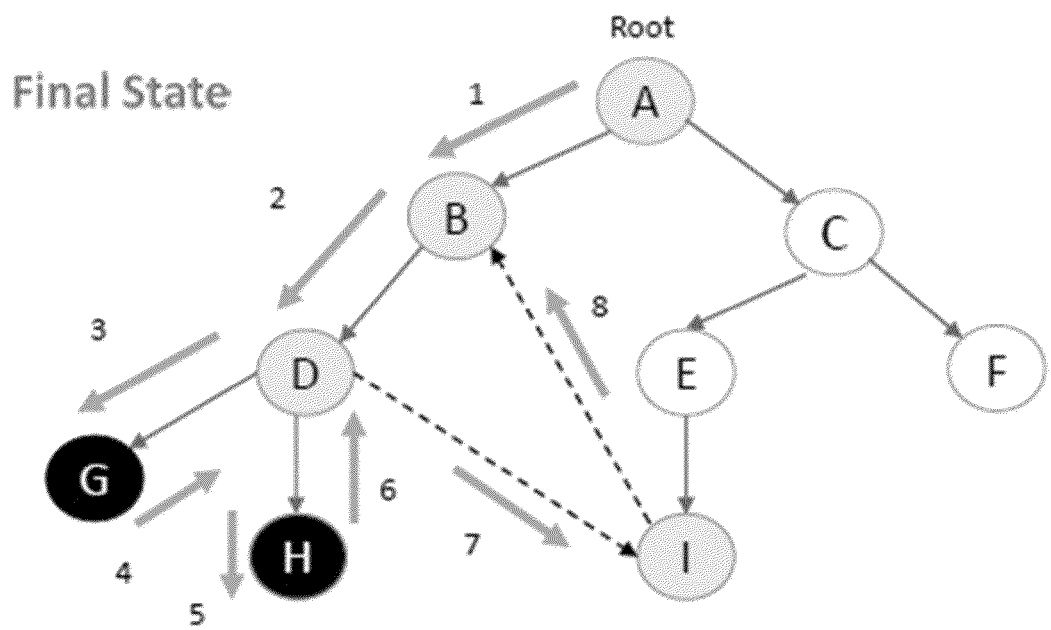

FIGS. 10A and 10B illustrate a similar tree data structure, in an initial state (FIG. 10A), and a final state (FIG. 10B), within the context of the DFS scheme, but in this example implementation, the tree data structure has a cycle. Similar to above, this scheme includes forward traversal from white colored root node A to the left most child node B. Root A node is marked grey. White node B is marked grey, and forward traversal reaches node B's leftmost child node D. White node D is marked grey, and further forward traversal reaches node D's leftmost child node G, which is a leaf node, and so node G is marked black. Next, backward traversal reaches parent node D, which is grey. In search for any remaining white children (leftmost first), node H is found. White node H is then marked black because node H is a leaf node. Next, backward traversal from node H to parent node D to search for any remaining white children, resulting in finding node I. White node I is marked grey, and then forward traversal is implemented to reach child node B. Node B is a grey node, and reaching a grey node via forward traversal is inconsistent with a cycle-less graph, and so reaching a grey node B via such forward traversal indicates the presence of a cycle within this tree data structure.

In some instances, when a cycle is identified and/or detected within a tree, an alert can be provided (e.g., by the processor of compute device executing the cycle management such as processor 112 of compute device 110 of FIG. 1) to a user and/or manager. In some instances, the alert can included details of where the cycle management process failed to aid the user and/or manager in removing the cycle from the tree. In some instances, the processor executing the cycle management process can automatically remove a node that fails the cycle management process. In some instances, the cycle management process can be executed in response to modification of the tree (or a proposed modification of the tree). In such instances, if the modification (or proposed modification) causes a cycle within the tree, the processor can revert the tree to its state prior to the modification (or proposed modification).

In some instances, it may be desirable to use a particular cycle management scheme (e.g., recursive rather than DFS, or vice versa). For example, in some instances, a recursive scheme may be faster and/or more efficient than a DFS scheme. As described above, a recursive scheme includes identifying leaf nodes. In some instances, leaf nodes and/or the nodes immediately adjacent the leaf nodes are identified before a cycle management scheme has been initiated. Such identification can occur, for example, during mapping (e.g., mapping a data asset to a leaf node) and/or sub-selection. In this manner, a portion of the recursive scheme that identifies leaf nodes can be skipped, and instead, the recursive scheme can begin with removing those already-identified leaf nodes, and, in some instances, the nodes immediately adjacent the leaf nodes, since it can be inferred that those nodes will be leaf nodes when the current leaf nodes are removed. In such a scenario, given the reduction in required steps, the recursive scheme may be desirable to a DFS scheme.

Further, in some implementations, in instances in which the leaf nodes and the nodes immediately adjacent the leaf nodes have been identified (e.g., via mapping and/or sub-selection), for example, the recursive scheme can be initiated to first remove both the leaf nodes that have been identified, and the nodes immediately adjacent the leaf nodes that have been identified, and then, if applicable, identify a set of leaf node(s) not yet identified, and proceed as described in further detail above with respect to FIGS. 7A-8B.

As another example, in instances in which the leaf nodes have not be identified (e.g., by prior mapping and/or sub-selection), it may be desirable to use a DFS scheme rather than a recursive scheme, because in some implementations, such a DFS scheme may be faster and/or more efficient (e.g., less computing power required) than the recursive scheme.

Accordingly, in connection with any of the embodiments described herein, in some implementations and/or instances, a processor of a compute device (such as a processor 112 of compute device 110 of FIG. 1) can select a particular cycle management scheme based on a number of leaf nodes that have already been identified. If, for example, no leaf nodes (or below a predetermined threshold of leaf nodes) have been identified, the processor can select a DFS scheme, whereas if one or more leaf nodes (or a number of leaf nodes above the predetermined threshold) have been identified, the processor can select a recursive scheme.

Figure 11:
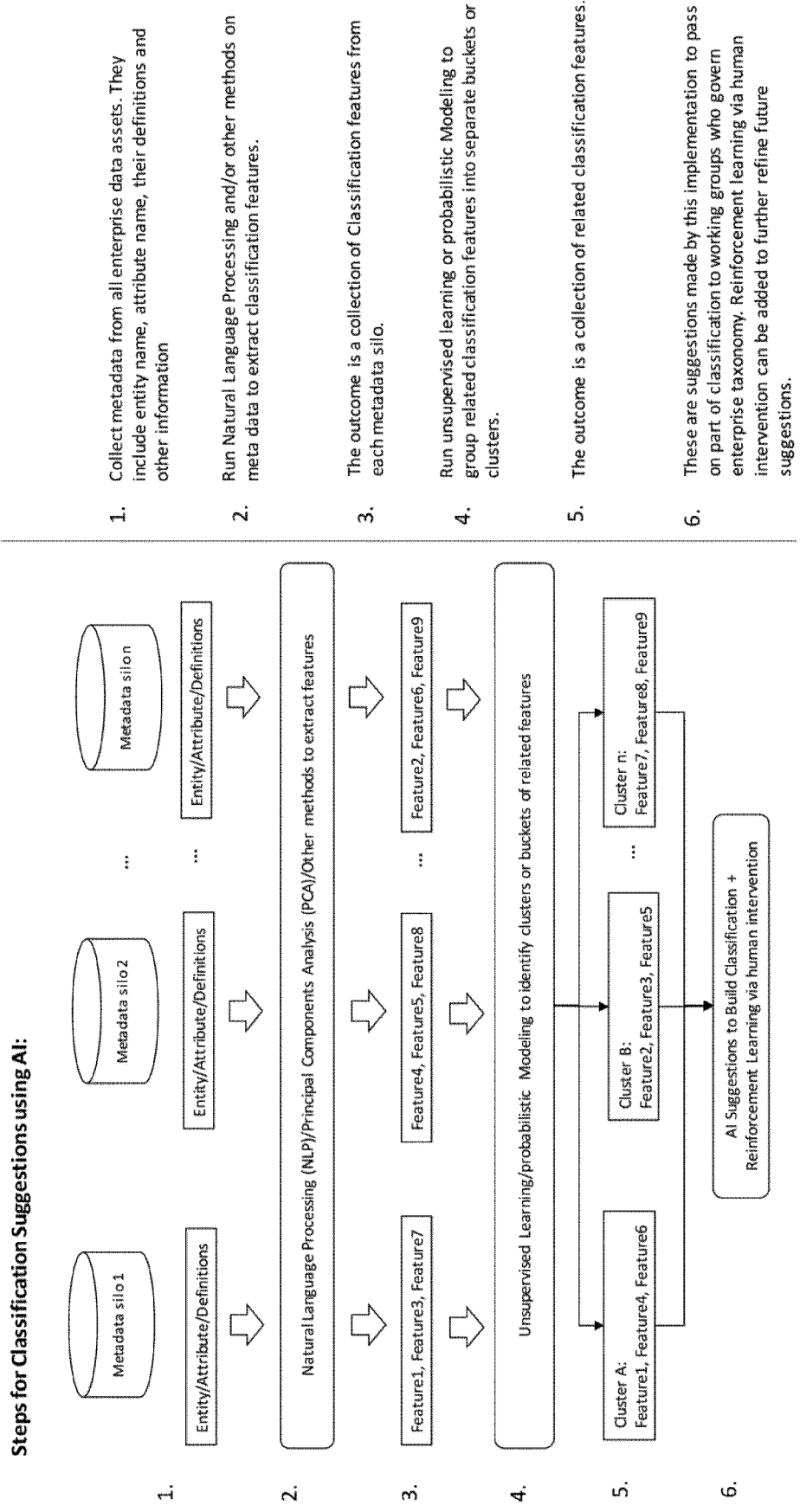
FIG. 11 is a schematic process diagram illustrating a process for developing a classification structure, according to an embodiment.

As described previously herein, in some embodiments, artificial intelligence (AI), including for example a machine learning model (e.g., machine learning model 113), can be used to develop a classification structure. FIG. 11 is a schematic process diagram illustrating a process (e.g., executed by a processor such as processor 112 of FIG. 1) for developing a classification structure, according to an embodiment. In this embodiment, metadata from data assets (e.g., enterprise data assets) can be collected or otherwise accessed (e.g., from within metadata silos and/or memory). The metadata of the data assets can include, for example, an entity name, an attribute name, definitions, and/or any other suitable information. With the metadata collected, natural language processing and/or other suitable methods can be used with the metadata to extract classification features therefrom, thereby producing a collection of classification features from each metadata silo, as shown in FIG. 11. Next, unsupervised learning and/or probabilistic modeling can be used to group related classification features into separate buckets, clusters, and/or the like, thereby producing a collection of related classification features. In this manner, the machine learning model can provide suggestions for classifications to be passed on to working groups and/or users that govern or otherwise provide input to enterprise taxonomy. In some implementations, human intervention is applied to reinforce the machine learning model and further refine the suggestions.

Figure 12:
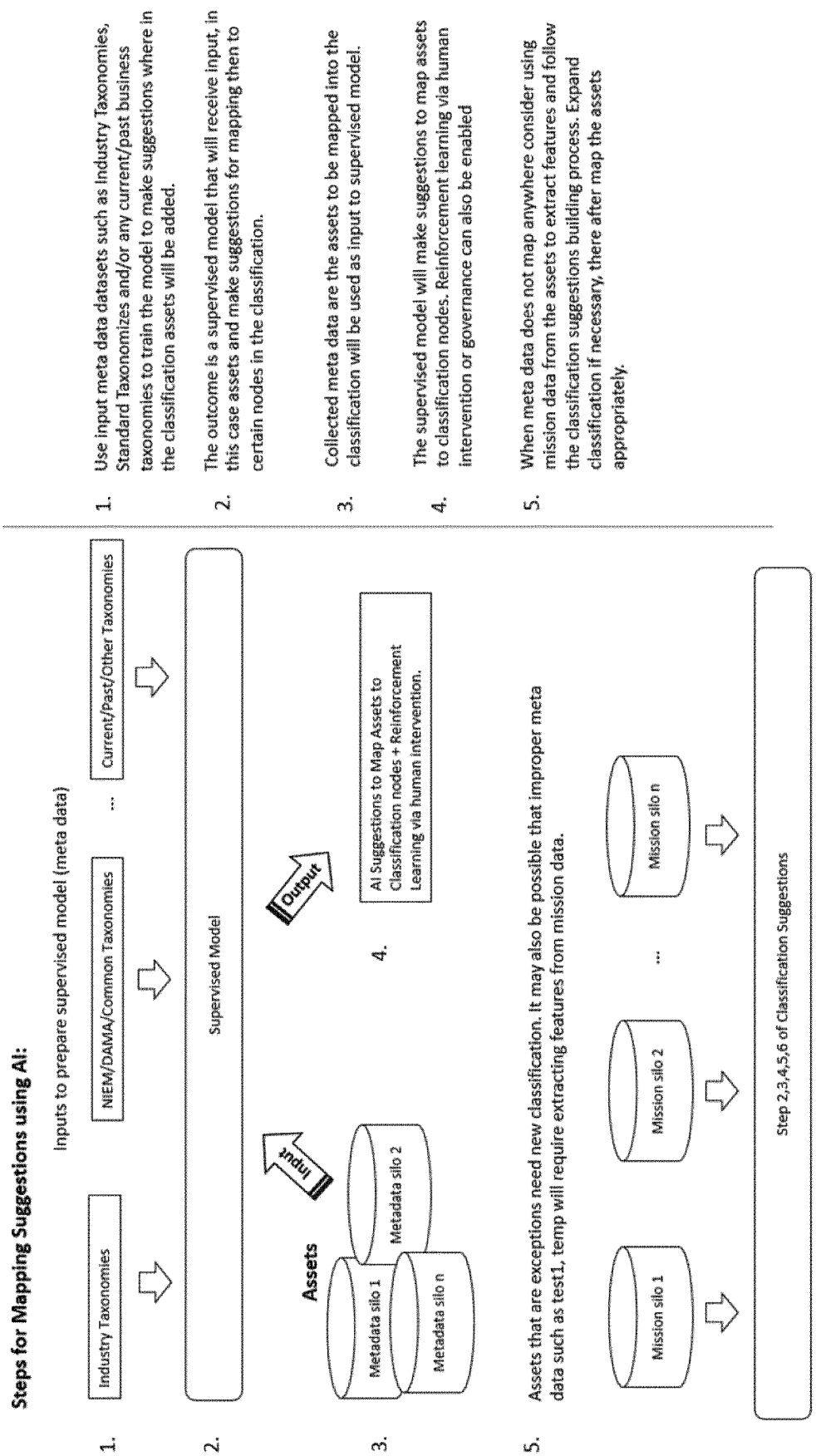
FIG. 12 is a schematic process diagram illustrating a process for mapping assets, according to an embodiment.

As described previously herein, in some embodiments, AI, including for example a machine learning model (e.g., machine learning model 113), can be used to map assets or provide suggestions as to how to map assets to a tree data structure, or the like. FIG. 12 is a schematic process diagram illustrating a process for mapping assets (e.g., executed by a processor such as processor 112 of FIG. 1), according to an embodiment. In this embodiment, various datasets can be used to prepare a machine learning model (e.g., a supervised machine learning model) and to make suggestions as to where in the classification assets can be added, attached, linked, and/or the like. Such datasets can include, for example, industry taxonomies, standard taxonomies, current and/or past business taxonomies, and/or the like. The outcome is a supervised machine learning model that can receive inputs (e.g., assets) and produce suggestions for mapping the inputs to certain nodes within the tree data structure or classification. The collected metadata described with respect to FIG. 11 can be used by the supervised machine learning model to map the assets into the classification. The supervised machine learning model produces suggestions to map the assets to classification nodes. In some implementations, human intervention or governance can be used to reinforce the training and classification of the machine learning model. In some instances, some of the metadata and/or datasets will fail to map to a node. In such instances, in some implementations, mission data from the assets can be used to extract features, and those extracted features can be used for further mapping suggestions. Similarly stated, in some implementations, metadata of an asset can initially be used to map and/or classify the asset. If, however, such metadata is insufficient to map and/or classify the asset within the tree data structure and/or classification, the mission data can be used to map the asset.

In any of the embodiments described herein, in some implementations, instead of or in addition to using a machine learning model to define the tree data structure, a tree data structure can be initially formed or defined through human input / intelligence, and/or by using existing standards / example classifications (e.g., within the constraints described with respect to various embodiment herein).

While various benefits have been described above with respect to various embodiments described herein, the embodiments described herein can provide alternative or additional benefits, such as, for example, effective distribution of enterprise data; trustworthy and accurate data; democratized data; customized hierarchical classification of data, with the ability to organize data into and create links across subject areas to create an efficient line of sight into the data; connection of data assets to the defined classification; effective management of metadata to ensure access to most recent version of data; improved and leveraged insight into connected data assets to select sub-sections of data to create the requested or required dataset for decision-making purposes; attaching custom descriptors to existing metadata to help reconcile business definitions within existing definitions for data, providing both mission and technical users with the ability to look at data and readily understand how it relates to existing business vocabulary to align with the mission and enable self-service; ability to implement cloud computing to provide improved scalability (e.g., elastically) to handle peak load times; API end points improve integration with existing systems; effective permissions management; improved reporting management with the ability to export data with ease and generate reports in connection with the defined classification structure(s); use of semantic search features to find the correct data assets; and visualization features to help a user readily understand the classification structure and relationships therein, which can aid in understanding data flow and data use within the organization; identification of redundant and/or state data; architectural visibility; improved collaboration between members of the organization due in part to use of common vocabularies; improved understanding of the context around an organization's data and relationships between various data assets; ability to identify and collect similar datasets and remove redundancies to ensure there is a single source for data and a single version of truth, thereby reducing the time spent reconciling different versions of datasets and avoidance of using stale data; and the like.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
    extracting metadata associated with a plurality of assets from a plurality of electronic sources;
    defining a tree data structure (1) using a machine learning model and (2) based on the metadata, wherein the tree data structure includes a leader subtree and a follower subtree that is linked to, dependent upon, and mirrors at least a portion of a hierarchical classification structure of the leader subtree,
    updating the portion of the hierarchical classification structure of the leader subtree based on an update to the metadata;
    correspondingly propagating the update of the portion of the hierarchical classification structure to the follower subtree, the hierarchical classification structure including internal classification nodes and external classification nodes, the portion of the hierarchical classification structure including the internal classification nodes of the leader subtree, both the leader subtree and the follower subtree being linked to a common root node of the tree data structure;
    matching the metadata to attributes assigned to classification nodes within the tree data structure to map the plurality of assets into data nodes of the tree data structure;
    receiving a query for an asset from the plurality of assets, the query including a query attribute; and
    parsing the query to traverse the tree data structure to locate the asset based at least in part on the query attribute and at least one of the attributes assigned to the classification nodes.

2. The method of claim 1, wherein the machine learning model includes at least one of a neural network, a decision tree model, a random forest model, or a deep neural network.

3. The method of claim 1, wherein the defining the tree data structure includes defining the tree data structure at a first time, the method further comprising:
    modifying the tree data structure at a second time after the first time based on a user-provided indication of a change to the machine learning model to produce a modified tree data structure.

4. The method of claim 1, further comprising:
    receiving an instruction to add or modify an attribute assigned to an internal classification node of the leader subtree; and
    in response to the instruction, both adding or modifying the attribute to the classification node of the leader subtree and propagating the instruction to the follower subtree such that the attribute is added or modified at an external classification node of the follower subtree.

5. The method of claim 1, wherein the defining the tree data structure does not include access to and use of mission data of the plurality of assets.

6. The method of claim 1, wherein the matching the metadata to attributes assigned to classification nodes includes mapping an asset from the plurality of assets to a data node of the leader subtree, the asset not being mapped to the follower subtree based on the matching.

7. The method of claim 1, further comprising:
    adding an indication of the query to a distributed ledger, the indication including defining a block and linking the block to a blockchain.

8. The method of claim 1, further comprising:
    receiving an instruction to modify the hierarchical classification structure of the leader subtree;
    in response to the instruction, modifying the hierarchical classification structure of the leader subtree; and
    in response to modifying the hierarchical classification structure of the leader subtree, sending an alert to an administrator associated with the follower subtree indicative of the modified hierarchical classification structure and modifying the follower subtree in accordance with the instruction.

9. The method of claim 1, further comprising:
    updating an attribute assigned to an external classification node of the follower subtree based on an update to an attribute assigned to an internal classification node of the leader subtree.

10. The method of claim 1, wherein the matching the metadata to map the plurality of assets into the tree data structure includes mapping a first asset from the plurality of assets to a data node of the leader subtree based on an attribute assigned to a classification node of the leader subtree, and mapping a second asset from the plurality of assets to a data node of the follower subtree based on an attribute assigned to a classification node of the follower subtree, the first asset and the second asset being different, the mapping the first asset to the data node of the leader subtree having no impact on any data node of the follower subtree.

11. The method of claim 1, wherein the matching the metadata to map the plurality of assets into the tree data structure excludes access to and use of mission data of the plurality of assets.

12. A non-transitory processor-readable medium storing code representing instructions to be executed by a processor, the code comprising code to cause the processor to:
    extract metadata associated with a plurality of assets from a plurality of electronic sources;
    define, using a machine learning model and based on the metadata, a tree data structure including a leader subtree and a follower subtree that is linked to, dependent upon, and mirrors internal classification nodes, but not external classification nodes, of the leader subtree, wherein an update to an attribute or metadata associated with an internal classification node of the leader subtree correspondingly propagates, based on the updated attribute or updated metadata, to the follower subtree and the update is made to the follower subtree, the update to the attribute or metadata not including use of or access to mission data of the plurality of assets;

match the metadata to attributes assigned to the internal classification nodes of the leader subtree and the internal classification nodes of the follower subtree to map the plurality of assets into data nodes of the tree data structure;

receive a query for an asset from the plurality of assets, the query including a query attribute;

parse the query to traverse the tree data structure to locate the asset based at least in part on the query attribute and at least one of the assigned attributes; and update an asset from the plurality of assets that is linked to an internal classification node of the leader subtree, the update to the asset having no impact on any asset linked to the follower subtree.

13. The non-transitory processor-readable medium of claim 12, further comprising code to cause the processor to:

receive an instruction to add or modify an attribute assigned to an internal classification node of the leader subtree; and in response to the instruction, both add or modify the attribute to the classification node of the leader subtree and propagate the instruction to the follower subtree such that the attribute is added or modified at an external classification node of the follower subtree.

14. The non-transitory processor-readable medium of claim 12, wherein the code to cause the processor to define the tree data structure does not include access to and use of mission data of the plurality of assets.

15. The non-transitory processor-readable medium of claim 12, wherein the code to cause the processor to match the metadata to attributes assigned to classification nodes includes code to cause the processor to map an asset from the plurality of assets to a data node of the leader subtree and to a data node of the follower subtree.

16. The method of claim 1, wherein the leader subtree and the follower subtree are not in a parent-child relationship.

17. The method of claim 1, wherein the leader subtree is linked to the common root node via a first path, and the follower subtree is linked to the common root node via a second path, the first path not being a subset of the second path.

18. The method of claim 1, wherein the leader subtree is linked to the common root node via a first path, and the follower subtree is linked to the common root node via a second path, at least a portion of the first path not coextensive with the second path.

19. A method, comprising:

extracting metadata associated with a plurality of assets from a plurality of electronic sources;

defining a tree data structure (1) using a machine learning model and (2) based on the metadata and not mission data of the plurality of assets, wherein the defined tree data structure includes a leader subtree and a follower subtree that mirrors at least a portion of a hierarchical classification structure of the leader subtree, wherein the leader subtree and the follower subtree are linked to a common root node of the tree data structure, wherein the leader subtree is linked to the common root node via a first path and the follow subtree is linked to the common root node via a second path that is not a subset of the first path;

updating the portion of the hierarchical classification structure of the leader subtree;

in response to the updating, correspondingly propagating the update to the follower subtree;

matching the metadata to attributes assigned to classification nodes within the tree data structure to map the plurality of assets into data nodes of the tree data structure;

receiving a query for an asset from the plurality of assets, the query including a query attribute; and parsing the query to traverse the tree data structure to locate the asset based at least in part on the query attribute and at least one of the attributes assigned to the classification nodes.

20. The method of claim 19, wherein the matching the metadata to attributes assigned to classification nodes includes mapping an asset from the plurality of assets to a data node of the leader subtree, the asset not being mapped to the follower subtree based on the matching.

* * * * *

UNITED STATES PATENT AND TRADEMARK OFFICE
CERTIFICATE OF CORRECTION

PATENT NO. : 11,720,600 B1  
APPLICATION NO. : 16/716195  
DATED : August 8, 2023  
INVENTOR(S) : Chintan Dixit et al.

Page 1 of 1

It is certified that error appears in the above-identified patent and that said Letters Patent is hereby corrected as shown below:

In the Claims

In Column 23, Line 4 (Claim 12): delete "classification nodes of the leader subtree and the internal" and insert --classification nodes of the leader subtree and internal--

In Column 23, Line 23 (Claim 13): delete "bute to the classification node of the leader subtree and" and insert --bute assigned to the internal classification node of the leader subtree and--

In Column 24, Line 19 (Claim 19): delete "path and the follow subtree is linked to the common" and insert --path and the follower subtree is linked to the common--

In Column 24, Line 39 (Claim 20): delete "data node of the leader subtree, the asset not being mapped" and insert --data node of the leader subtree, the asset mapped to the data node of the leader subtree not being mapped--

Signed and Sealed this  
Seventeenth Day of September, 2024

Katherine Kelly Vidal  
*Director of the United States Patent and Trademark Office*